US012731908B1

(12) United States Patent
Lim

(10) Patent No.: US 12,731,908 B1
(45) Date of Patent: Sep. 8, 2026

(54) OPEN ENDED SUBSTRATE INTEGRATED WAVEGUIDE (OESIW) ANTENNA ARRAY

(71) Applicant: Waymo LLC, Mountain View, CA (US)

(72) Inventor: Chan Ping Edwin Lim, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 309 days.

(21) Appl. No.: 18/364,610

(22) Filed: Aug. 3, 2023

(51) Int. Cl.
*H01Q 21/00* (2006.01)

(52) U.S. Cl.
CPC ..... *H01Q 21/0081* (2013.01); *H01Q 21/0087* (2013.01)

(58) Field of Classification Search
CPC ............... H01Q 21/0081; H01Q 13/10; H01Q 21/0087; H01P 3/121
See application file for complete search history.

(56) References Cited

U.S. PATENT DOCUMENTS

| | | | | | |
|---|---|---|---|---|---|
| 4,516,131 | A * | 5/1985 | Bayha | H01Q 13/28 | 343/770 |
| 5,380,386 | A * | 1/1995 | Oldham | H01P 11/00 | 333/248 |
| 7,453,410 | B2 * | 11/2008 | Chang | H01Q 21/08 | 333/120 |
| 9,876,282 | B1 * | 1/2018 | Izadian | G01S 7/03 | |
| 10,193,235 | B2 * | 1/2019 | Izadian | H01Q 21/0037 | |
| 10,325,850 | B1 * | 6/2019 | Convert | H10W 20/427 | |
| 11,749,883 | B2 * | 9/2023 | Li | H01Q 21/0043 | 343/711 |
| 2003/0096081 | A1 * | 5/2003 | Lavallee | B01F 33/30 | 428/156 |
| 2004/0090290 | A1 * | 5/2004 | Teshirogi | H01Q 21/005 | 333/237 |
| 2006/0164315 | A1 * | 7/2006 | Munk | H01Q 21/064 | 343/772 |

(Continued)

FOREIGN PATENT DOCUMENTS

WO 2021097850 A1 5/2021

OTHER PUBLICATIONS

Djerafi et al., "Substrate Integrated Waveguide Antennas", Handbook of Antenna Technologies (2015).

*Primary Examiner* — Dameon E Levi
*Assistant Examiner* — Jordan E. DeWitt
(74) *Attorney, Agent, or Firm* — McDonnell Boehnen Hulbert & Berghoff LLP

(57) ABSTRACT

Example embodiments relate to Open Ended Substrate Integrated Waveguide (OESIW) antenna arrays and techniques for manufacturing and using OESIW antenna arrays. An example antenna array includes a waveguide and a waveguide feed coupled to the waveguide. The waveguide feed is configured to couple electromagnetic energy between an external source and the waveguide. The antenna array also includes a printed circuit board (PCB) having a plurality of antenna elements. The PCB is coupled to the waveguide at a plurality of coupling points such that the electromagnetic energy propagates out from the waveguide and through the plurality of antenna elements. An OESIW antenna array can be used within a radar unit, communication system, or other type of signal emitter.

20 Claims, 18 Drawing Sheets

(56) References Cited

U.S. PATENT DOCUMENTS

2009/0315796 A1* 12/2009 Kodama .............. H01Q 21/064
343/772
2010/0060537 A1* 3/2010 Nagayama ........... H01Q 21/064
343/776
2010/0066631 A1* 3/2010 Puzella ................ H01Q 9/0414
29/601
2010/0238085 A1* 9/2010 Fuh ........................ H01Q 13/22
343/771
2011/0187614 A1* 8/2011 Kirino ..................... G01S 7/032
333/239
2011/0291874 A1* 12/2011 De Mersseman ....... G01S 13/87
342/70
2011/0316734 A1* 12/2011 Svensson ................. H01Q 9/16
342/175
2015/0222021 A1* 8/2015 Stevenson ............ H01Q 21/005
343/771
2015/0222022 A1* 8/2015 Kundtz .................. H01Q 21/24
343/771
2016/0047893 A1* 2/2016 Izadian ................ H04B 7/0617
342/368
2016/0204514 A1* 7/2016 Miraftab .............. H01Q 21/005
343/731
2016/0301143 A1* 10/2016 Cao ........................... H01P 5/12
2017/0222323 A1* 8/2017 Brown ................. H01Q 1/3233
2017/0354043 A1* 12/2017 Campbell ................ H05B 3/26
2018/0231635 A1* 8/2018 Woehlte ............. H01Q 21/0006
2018/0301820 A1* 10/2018 Bregman ................ H01P 3/123
2020/0083605 A1* 3/2020 Quarfoth .............. H01Q 13/206
2020/0136225 A1* 4/2020 Shi .......................... G01S 7/032
2020/0153108 A1* 5/2020 Uemichi .............. H01Q 13/106
2020/0194900 A1* 6/2020 Doyle .................. H01Q 21/064
2020/0220273 A1* 7/2020 Ahmadloo ......... H01Q 21/0043
2020/0227808 A1* 7/2020 Salem .................... H01Q 25/02
2020/0335873 A1* 10/2020 Achour .................. H01Q 5/371
2020/0363498 A1* 11/2020 Brown .................... H01P 5/107
2021/0028549 A1* 1/2021 Doyle .................. H01Q 21/005
2022/0200115 A1* 6/2022 Li ........................ H01Q 1/3233
2022/0209424 A1* 6/2022 Xu ........................... H01Q 1/32
2022/0302595 A1* 9/2022 Lahav .................. H01Q 21/064
2022/0302596 A1* 9/2022 Alexanian .......... H01Q 21/0031
2022/0344829 A1* 10/2022 Xing .................... H01Q 21/064
2023/0146641 A1* 5/2023 Kim ....................... H01Q 21/06
342/27
2023/0352845 A1* 11/2023 Gupta .................... H01Q 19/10
2023/0420857 A1* 12/2023 Garcia Tejero ......... G01S 7/027

* cited by examiner

OPEN ENDED SUBSTRATE INTEGRATED WAVEGUIDE (OESIW) ANTENNA ARRAY

BACKGROUND

Advancements in computing, sensors, and other technologies have enabled some vehicles to navigate safely between locations autonomously, i.e., without requiring input from a human driver. By processing sensor measurements of the surrounding environment in real-time, an autonomous vehicle can transport passengers or objects (e.g., cargo) between locations while avoiding obstacles, obeying traffic requirements, anticipating movements of nearby agents, and performing other actions that are typically conducted by a driver. Shifting both decision-making and control of the vehicle over to vehicle systems can allow passengers to devote their attention to tasks other than driving.

SUMMARY

Example embodiments relate to Open Ended Substrate Integrated Waveguide (OESIW) antenna arrays and techniques for manufacturing and using OESIW antenna arrays. OESIW antenna arrays can be implemented for high quality signal transmission and reception as part of radar units, communication systems, and other transceivers and can be produced at reduced manufacturing complexity and cost compared to other types of antenna arrays.

In one aspect, an example antenna array is described. The antenna array includes a waveguide and a waveguide feed coupled to the waveguide. The waveguide feed is configured to couple electromagnetic energy between an external source and the waveguide. The antenna array also includes a printed circuit board (PCB) having a plurality of antenna elements. The PCB is coupled to the waveguide at a plurality of coupling points such that the electromagnetic energy propagates out from the waveguide and through the plurality of antenna elements.

In another aspect, an example method is provided. The method involves generating, using computer numerical control (CNC) machining or die-casting, a waveguide and a waveguide feed coupled to the waveguide. The waveguide feed is configured to couple electromagnetic energy between an external source and the waveguide. The method also involves generating a PCB having a plurality of antenna elements and coupling the PCB to the waveguide at a plurality of coupling points to form an antenna array such that the electromagnetic energy is able propagate from the waveguide and through the plurality of antenna elements as signals.

In yet another aspect, an example radar unit is provided. The radar unit includes an external source configured to provide and receive electromagnetic energy and an antenna array coupled to the external source. The antenna array includes a waveguide and a waveguide feed coupled to the waveguide. The waveguide feed is configured to couple the electromagnetic energy between the external source and the waveguide. The antenna array also includes a PCB having a plurality of antenna elements. The PCB is coupled to the waveguide at a plurality of coupling points such that the electromagnetic energy propagates out from the waveguide and through the plurality of antenna elements.

These as well as other aspects, advantages, and alternatives will become apparent to those of ordinary skill in the art by reading the following detailed description, with reference, where appropriate, to the accompanying drawings.

DETAILED DESCRIPTION

Figure 1:
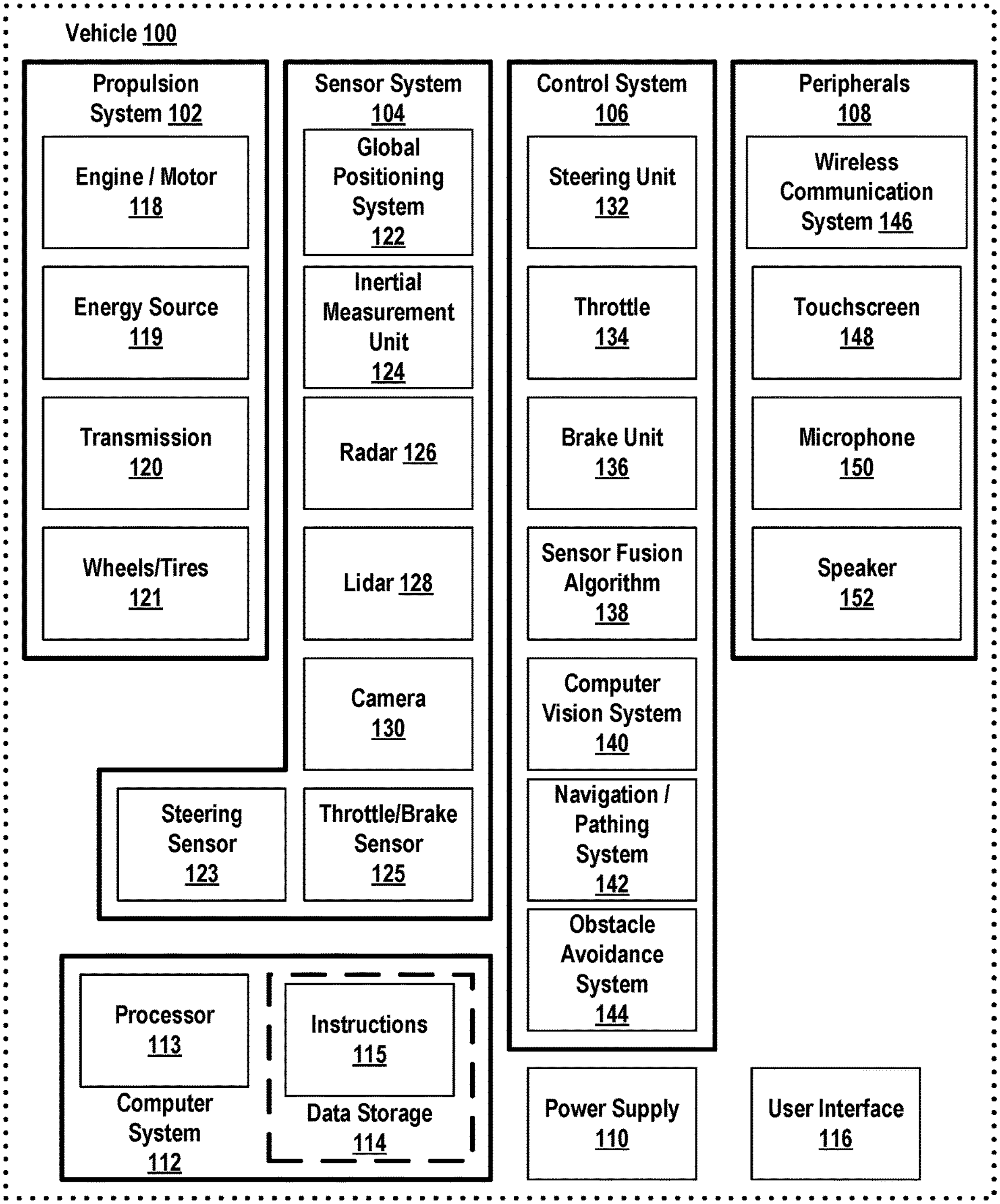
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Automotive radar involves using radio waves to detect the presence, distance, direction, and speed of objects in the surrounding environment of a vehicle. The vehicle radar system emits a radio signal from a transmitter, which then bounces off nearby objects and returns to a receiver. By analyzing the characteristics of the returned signal, the vehicle radar system can determine the location, speed, and direction of objects located in the environment, such as other vehicles, pedestrians, road boundaries, and obstacles. In some cases, radar data is used by a vehicle's advanced driver assistance systems (ADAS) to provide warnings to the driver or even take autonomous actions to avoid collisions. In other cases, a vehicle control system uses radar data when determining a control strategy for autonomous navigation by the vehicle.

Manufacturing of automotive radars and other types of antenna arrays typically involves using CNC machining, die-casting, or a combination of both techniques. CNC machining is a precision manufacturing technique that enables the fabrication of an antenna array by automating the machining process based on pre-programmed instructions. With CNC machining, the design specifications of the antenna are translated into precise machining movements and operations, ensuring the accurate production of each antenna element. The CNC machine follows the programmed instructions to precisely cut, shape, and drill the required materials, such as metal or composites, to create the individual antenna elements. The high level of control provided by CNC machining ensures that the dimensions, tolerances, and geometries of the antenna elements are consistently achieved, leading to reliable and high-performance antenna arrays. Detailed antenna designs typically require a substantial amount of time for CNC machining to complete.

Die-casting is another technique used to manufacturing antenna array components and involves injecting molten metal (e.g., aluminum or zinc) under high pressure into a die, which is a reusable mold specifically designed to create the desired antenna array shape. The molten metal fills the die cavities and solidifies, thereby forming the antenna elements with precise dimensions and intricate details. Once the antenna elements are cast, they can be further processed, such as through CNC machining or assembly, to create the complete antenna array.

Although CNC machining and die-casting techniques are able to produce reliable antenna arrays, these techniques also have drawbacks that can limit overall production of antenna arrays. For complex antenna array designs, CNC machining typically requires substantial time to machine individual antennas within the array, which can make using CNC machining slow and costly and therefore impede large scale production. Similarly, the fine details of some types of antenna elements (e.g., OEWG antenna elements) can be too challenging to die-cast due to the accuracies required for high performance antennas.

Example embodiments relate to open ended substrate-integrated waveguide (OESIW) antenna arrays and techniques for manufacturing OESIW antenna arrays, which can be implemented as part of vehicle radar units, communication systems, and other types of transceivers. The design of OESIW antenna arrays described herein avoids the manufacturing challenges described above by replacing the complex-to-manufacture antenna element layer with a PCB equipped with antenna elements that can be used to radiate and receive electromagnetic energy. The incorporation of the PCB equipped with antenna elements reduces the overall manufacturing complexity of producing antenna arrays, thereby enabling OESIW antenna arrays and devices that use OESIW antenna arrays (e.g., radar units) to be efficiently produced in high quantities at low costs. In addition, laboratory, field testing, and operational testing indicate that the performance of OESIW antenna arrays may match or exceed the performance of other types of antenna arrays, thereby enabling OESIW antenna arrays to replace OEWG and other types of antenna arrays as part of radar units and other types of devices to lower overall costs of production. Power consumption by OESIW antenna arrays can also be comparable or less than the power consumption of other types of antenna arrays due to minimal height of the PCB and antenna elements proximity relative to the waveguides within the OESIW.

An example OESIW antenna array may include one or multiple waveguides, one or multiple waveguide feeds, and antenna elements that can radiate and receive electromagnetic energy. Similar to other types of antenna arrays, the waveguides and waveguide feeds can be produced using traditional die-casting and/or CNC machining techniques. Unlike other antenna arrays, the antenna elements for the OESIW antenna array are generated as part of a PCB, which can be attached to the waveguides via adhesive or other coupling techniques. For instance, the PCB can be connected to the top side of one or multiple waveguides at one or multiple coupling points. Each coupling point serves as a connecting point that enables electromagnetic energy to radiate from inside the waveguide(s) and out through one or multiple antenna elements as emitted signals. Similarly, antenna elements in the PCB can also receive electromagnetic energy from the environment and enable the electromagnetic energy to radiate through the waveguides for subsequent processing by a processing component or components attached to the waveguide feeds.

The design of the PCB and corresponding antenna elements can vary within examples and can depend on the desired application of the antenna array. For example, the PCB can consist of three layers. The top and bottom layers can be copper or another type of metal while the middle layer is a PCB laminate. The bottom metal layer can have slots that are cut into the layer at positions that are located relative to coupling points when the PCB is attached to the waveguides. The top metal layer includes antenna elements that are etched at locations that align with the slots. As such, the quantity, size, and arrangement of the antenna elements on the PCB can vary within examples. For instance, the antenna elements can form one or multiple linear arrays, planar arrays, or a combination. In some examples, the antenna elements on the PCB can form one or multiple staggered linear arrays.

In addition, the PCB laminate can also include plated vias, also known as plated-through vias. Plated vias are components in a PCB that can connect different layers of the PCB and enable the flow of electrical signals or power between them. The PCB used for an OESIW antenna array can consist of multiple layers of conductive traces separated by insulating layers (i.e., dielectric material). The plated vias can be holes drilled through these layers and coated with a conductive material, such as copper, to create electrical pathways. As such, the plated vias allow interconnection between different layers of the PCB. By strategically placing vias, electrical connections can be established between traces on different layers, enabling the transfer of signals and power. The plated vias also help maintain signal integrity during the propagation of electromagnetic energy between the antenna elements on the PCB and the waveguides of the OESIW antenna array. By providing a low-resistance pathway between layers, plated vias help minimize signal degradation, such as signal loss, reflections, or electromagnetic interference (EMI). They enable a smooth transition for signals traveling between layers, ensuring reliable communication between components on the PCB. The plated vias can also enhance the mechanical stability and structural integrity of the PCB. They provide additional support and reinforcement, preventing the separation of different layers and reducing the risk of delamination. This is particularly useful for PCBs subjected to mechanical stress, such as those used in radar units that are positioned on vehicles.

Disclosed OESIW antenna arrays can have various forms within examples. For instance, an OESIW antenna array may take the form of a single-input single-output (SISO), single-input, multiple-output (SIMO), multiple-input single-output (MISO), multiple-input multiple-output (MIMO), and/or synthetic aperture radar (SAR) radar antenna architecture. In addition, example OESIW antenna arrays may be configured to operate at various electromagnetic wave frequencies, such as in the W-Band (e.g., 77 Gigahertz (GHz)). The W-Band may correspond to electromagnetic waves on the order of millimeters (e.g., 1 mm or 4 mm). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

An OESIW antenna array may involve a set of multiple connected antennas that can work together as a single antenna to transmit or receive signals. By combining multiple radiating elements (i.e., antennas), an OESIW antenna array may enhance the performance of the radar unit used in some embodiments. In particular, a higher gain and narrower beam may be achieved when a radar unit is equipped with one or more antenna arrays. Antennas on the PCB of an OESIW antenna array may be arranged in one or more linear antenna arrays (i.e., antennas within an array are aligned in a straight line, arranged in planar arrays (i.e., antennas arranged in multiple, parallel lines on a single plane), and/or multiple planes resulting in a three dimensional array. As such, a radar unit, communication device, or another type of transceiver may consist of one or multiple OESIW antenna arrays.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in the navigation of vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150 (e.g., one or more interior and/or exterior microphones), and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory, computer-readable medium, such as data storage 114. As such, processor 113 can represent one or multiple processors. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

Vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment that is surrounding vehicle 200. In other words, any sensor system now known or later created could be coupled to vehicle 200 and/or could be utilized in conjunction with various operations of vehicle 200. As an example, a lidar could be utilized in self-driving or other types of navigation, planning, perception, and/or mapping operations of vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed of in various other locations on the vehicle (e.g., at location 216) and could have fields of view that correspond to internal and/or surrounding environments of vehicle 200.

The sensor system 202 may be mounted atop vehicle 200 and may include one or more sensors configured to detect information about an environment that is surrounding vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of sensor systems 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of sensor systems 202, 204, 206, 208, 210, 212, 214, and/or 218 may be configured to rotate or pivot about an axis (e.g., the z-axis) perpendicular to the given plane so as to illuminate an environment that is surrounding vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of vehicle 200. For example, one or more sensor systems 202, 204, 206, 208, 210, 212, 214, and/or 218 could include one or more radars. In some examples, one or more radars can be located near the rear of vehicle 200 (e.g., sensor systems 208 and 210), to actively scan the environment near the back of vehicle 200 for the presence of radio-reflective objects. Similarly, one or more radars can be located near the front of vehicle 200 (e.g., sensor systems 212 or 214) to actively scan the environment near the front of vehicle 200. A radar can be situated, for example, in a location suitable to illuminate a region including a forward-moving path of vehicle 200 without occlusion by other features of vehicle 200. For example, a radar can be embedded in and/or mounted in or near the front bumper, front headlights, cowl, and/or hood, etc. Furthermore, one or more additional radars can be located to actively scan the side and/or rear of vehicle 200 for the presence of radio-reflective objects, such as by including such devices in or near the rear bumper, side panels, rocker panels, and/or undercarriage, etc.

Vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. The predetermined light pattern may comprise infrared light, or radiation at other suitable wavelengths for such measurements. In some examples, the camera can be mounted inside the front windshield of vehicle 200. Specifically, the camera can be situated to capture images from a forward-looking view with respect to the orientation of vehicle 200. Other mounting locations and viewing angles of the camera can also be used, either inside or outside vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Vehicle 200 may also include one or more acoustic sensors (e.g., one or more of sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment that is surrounding vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 200 may include one or more other components in addition to or instead of those shown. The additional components may include electrical or mechanical functionality.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
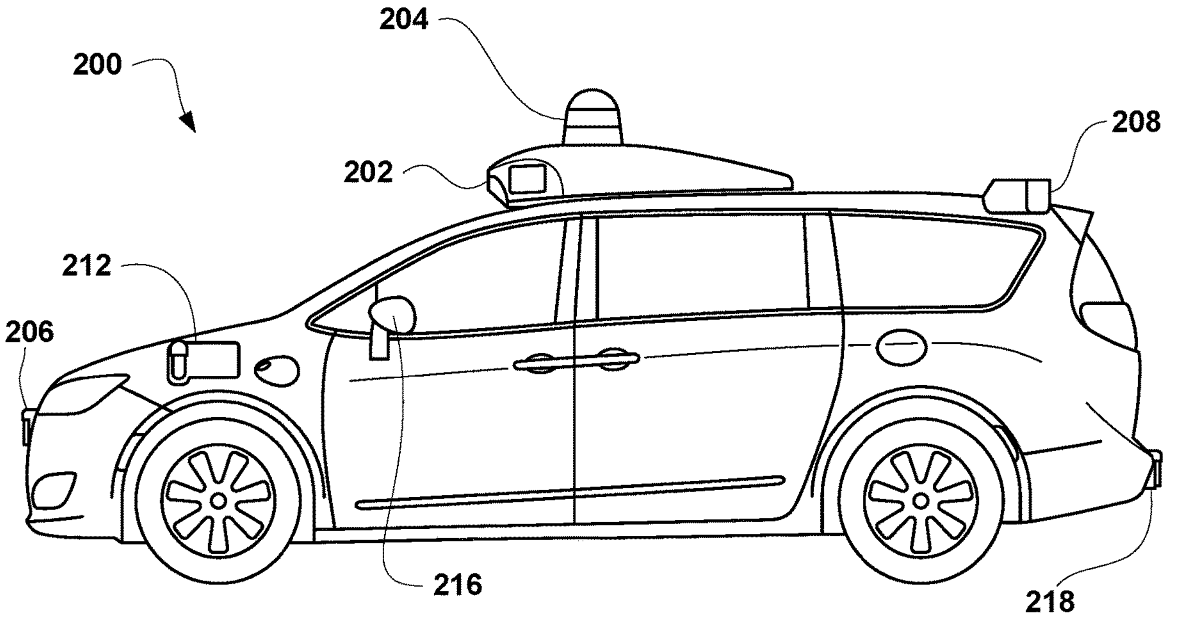
FIG. 2A is an illustration of a physical configuration of a vehicle, according to example embodiments.
Figure 2B:
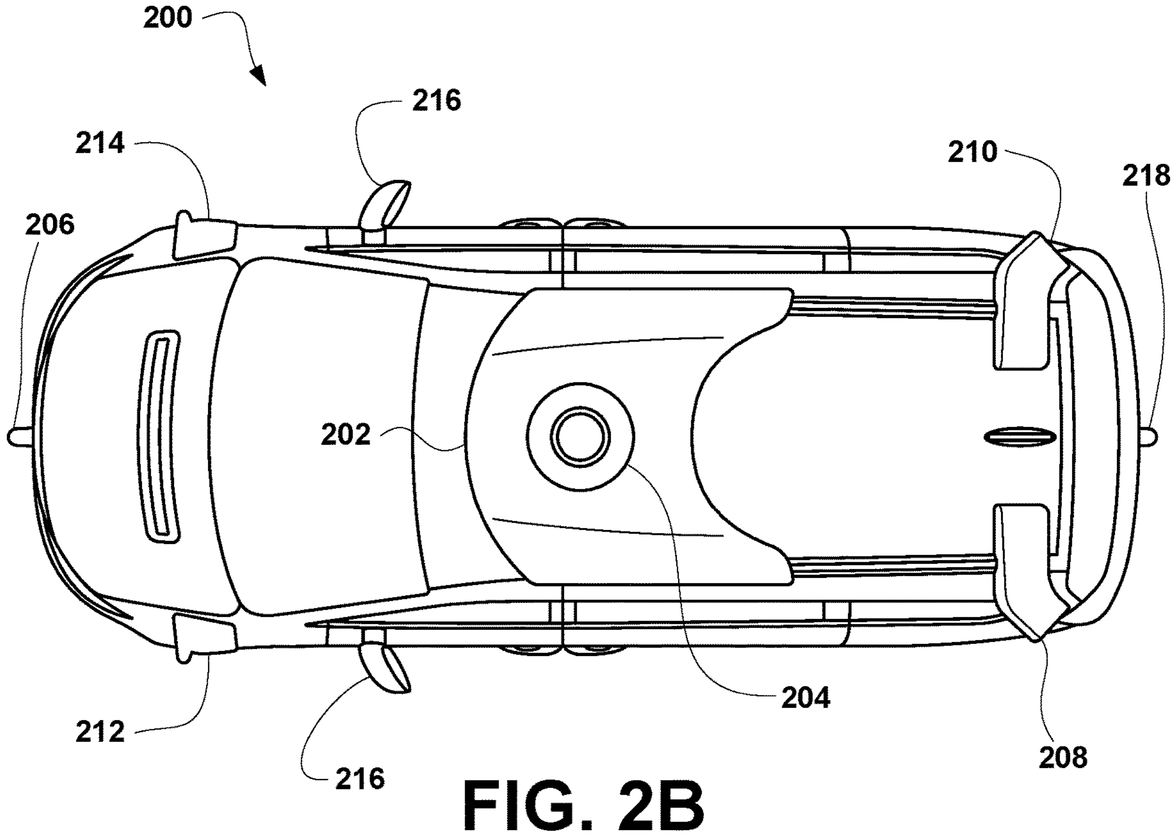
FIG. 2B is an illustration of a physical configuration of a vehicle, according to example embodiments.
Figure 2C:
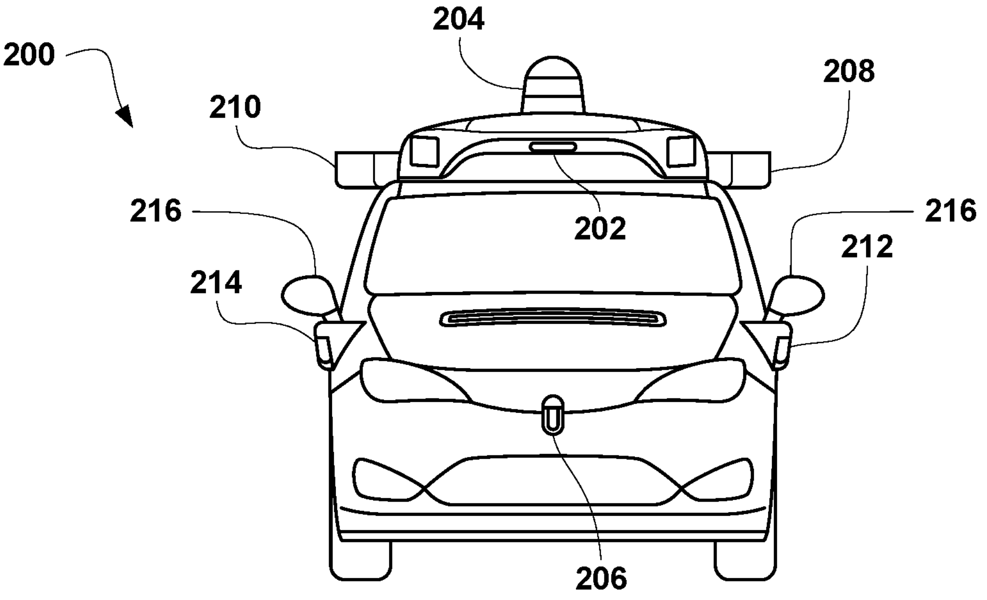
FIG. 2C is an illustration of a physical configuration of a vehicle, according to example embodiments.
Figure 2D:
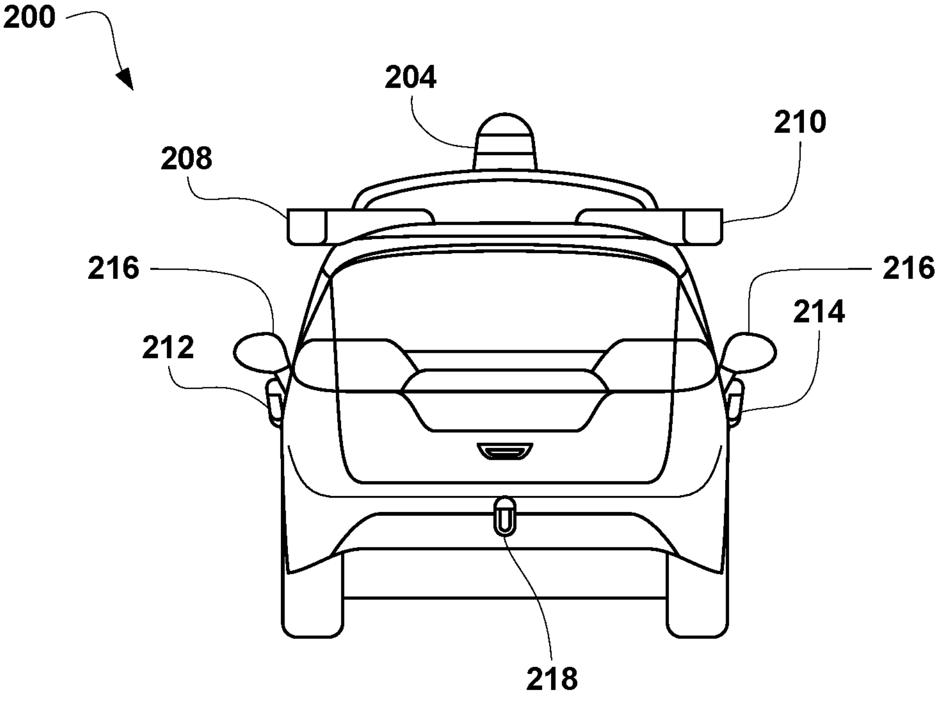
FIG. 2D is an illustration of a physical configuration of a vehicle, according to example embodiments.
Figure 2E:
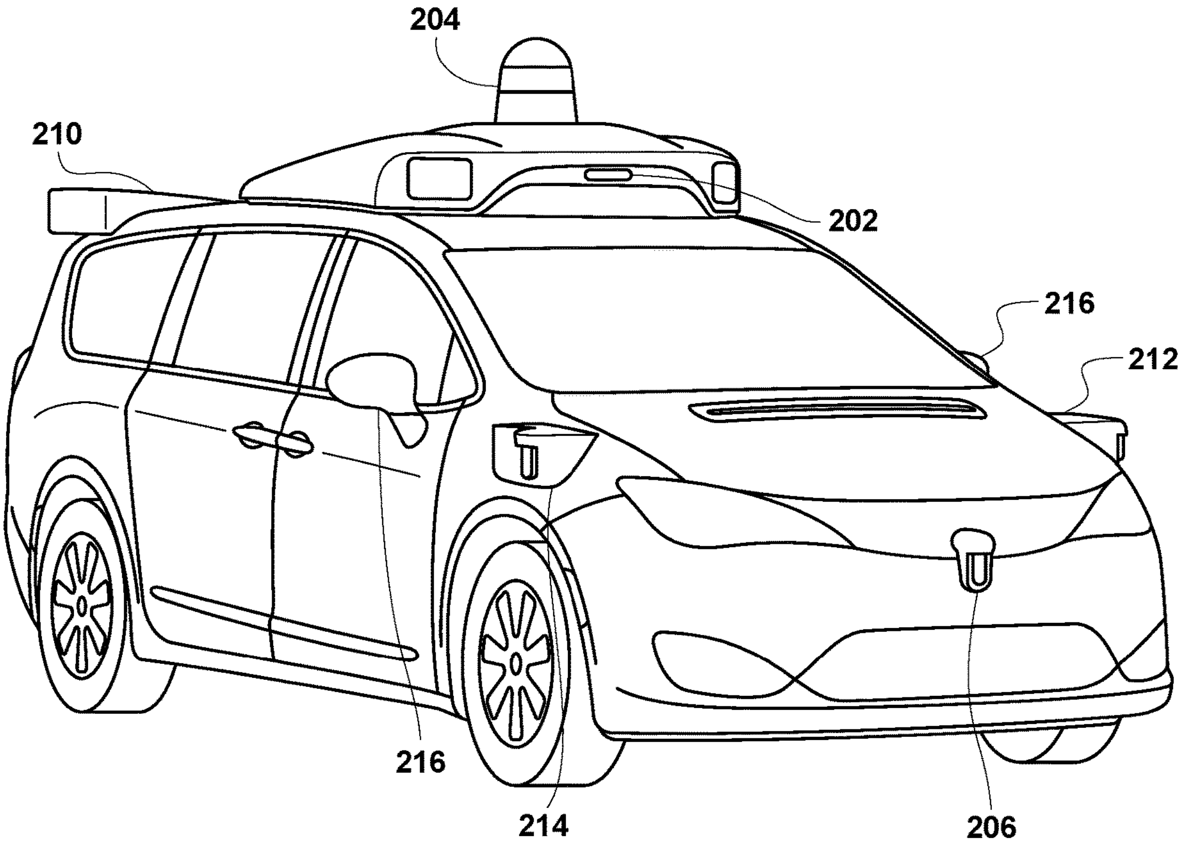
FIG. 2E is an illustration of a physical configuration of a vehicle, according to example embodiments.
Figure 2F:
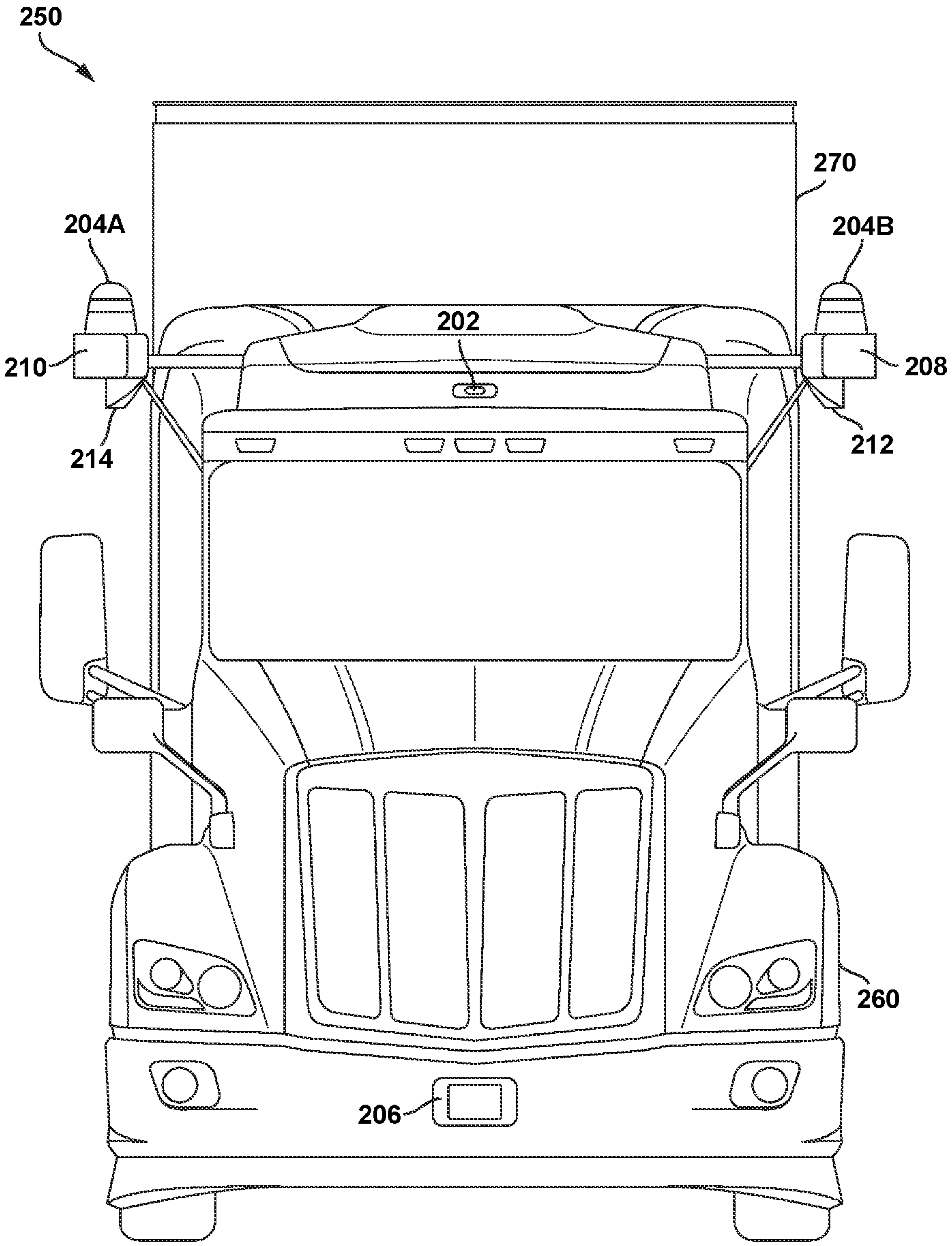
FIG. 2F is an illustration of a physical configuration of a vehicle, according to example embodiments.
Figure 2G:
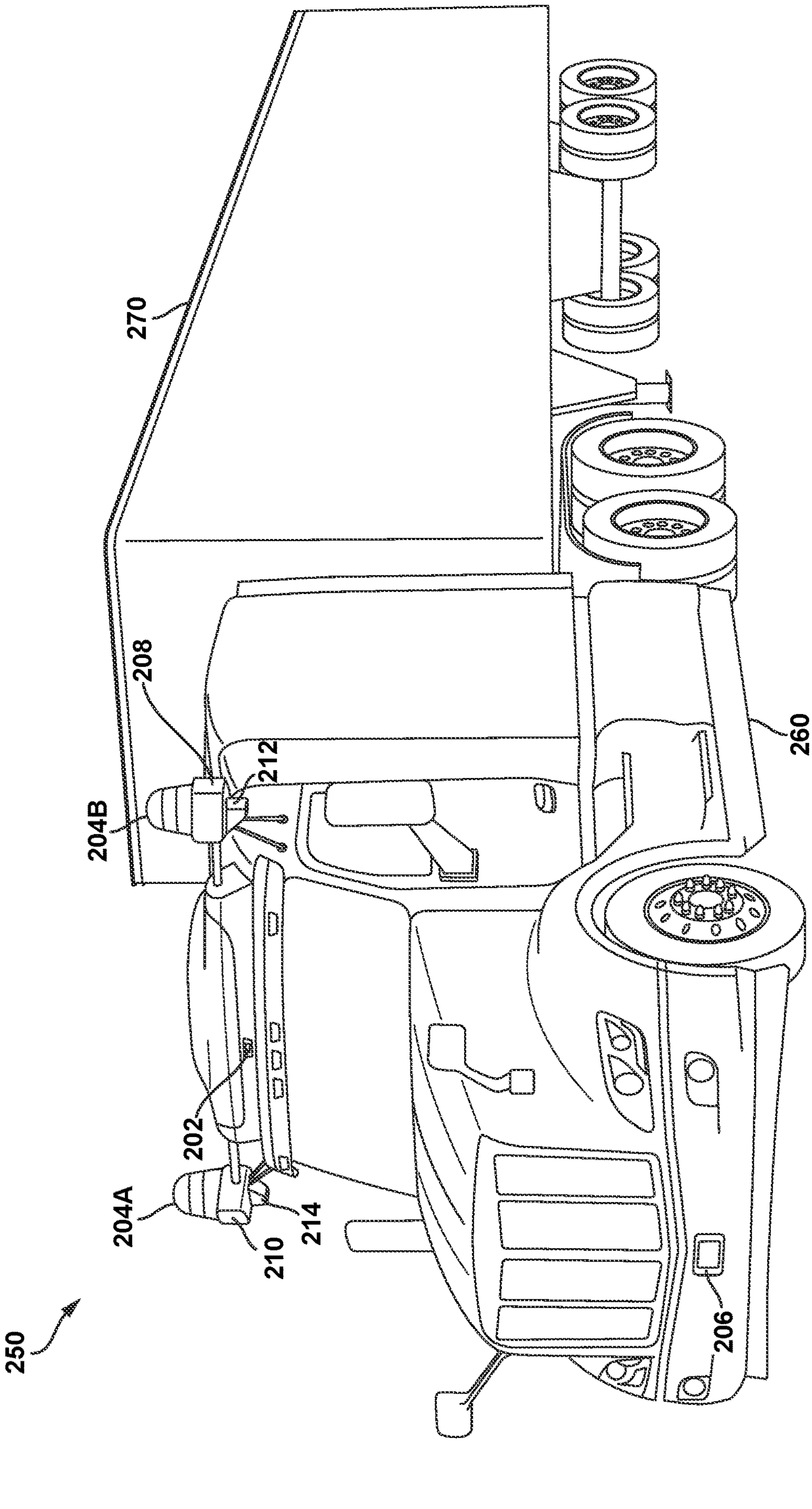
FIG. 2G is an illustration of a physical configuration of a vehicle, according to example embodiments.
Figure 2H:
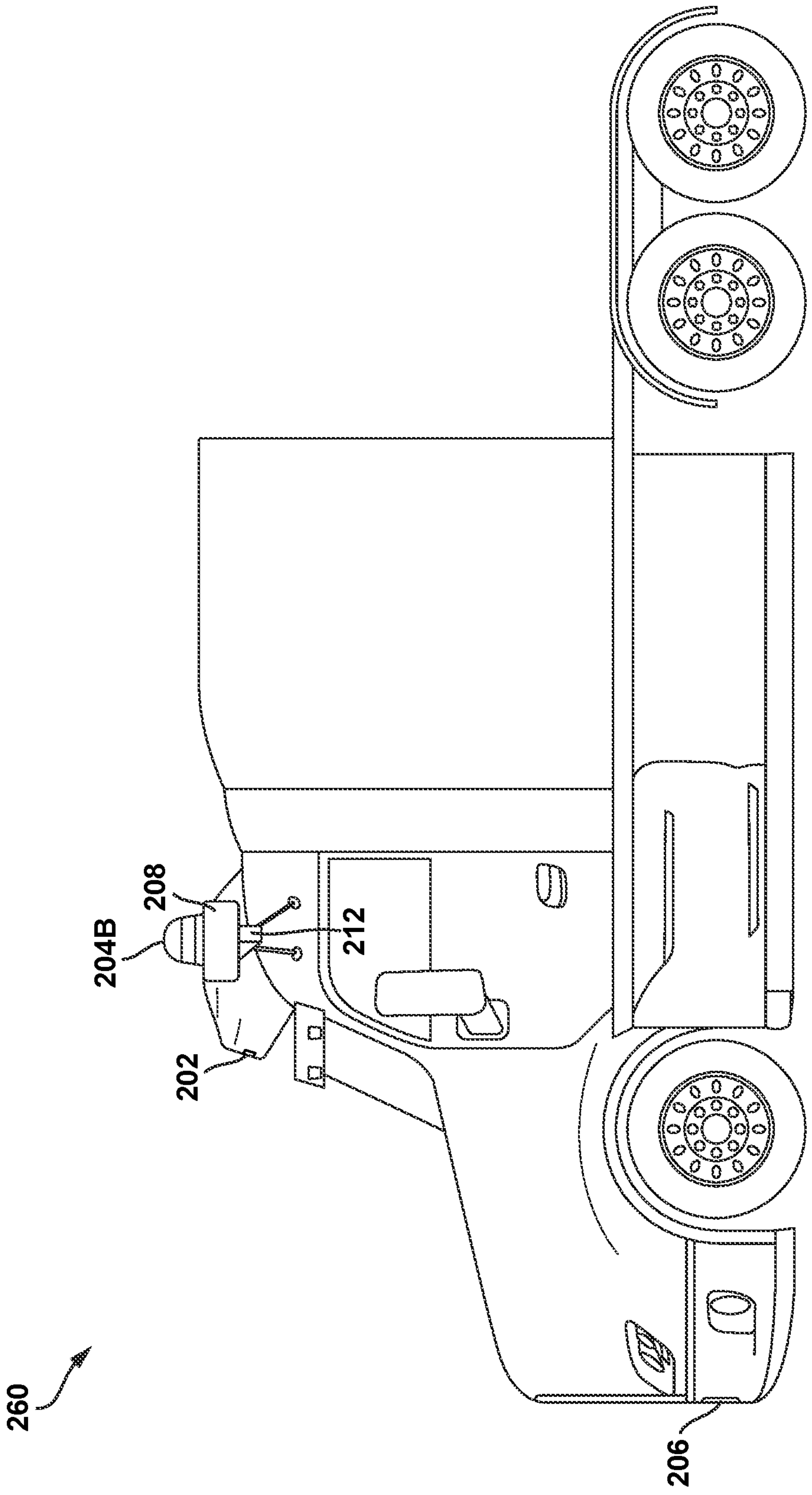
FIG. 2H is an illustration of a physical configuration of a vehicle, according to example embodiments.
Figure 2I:
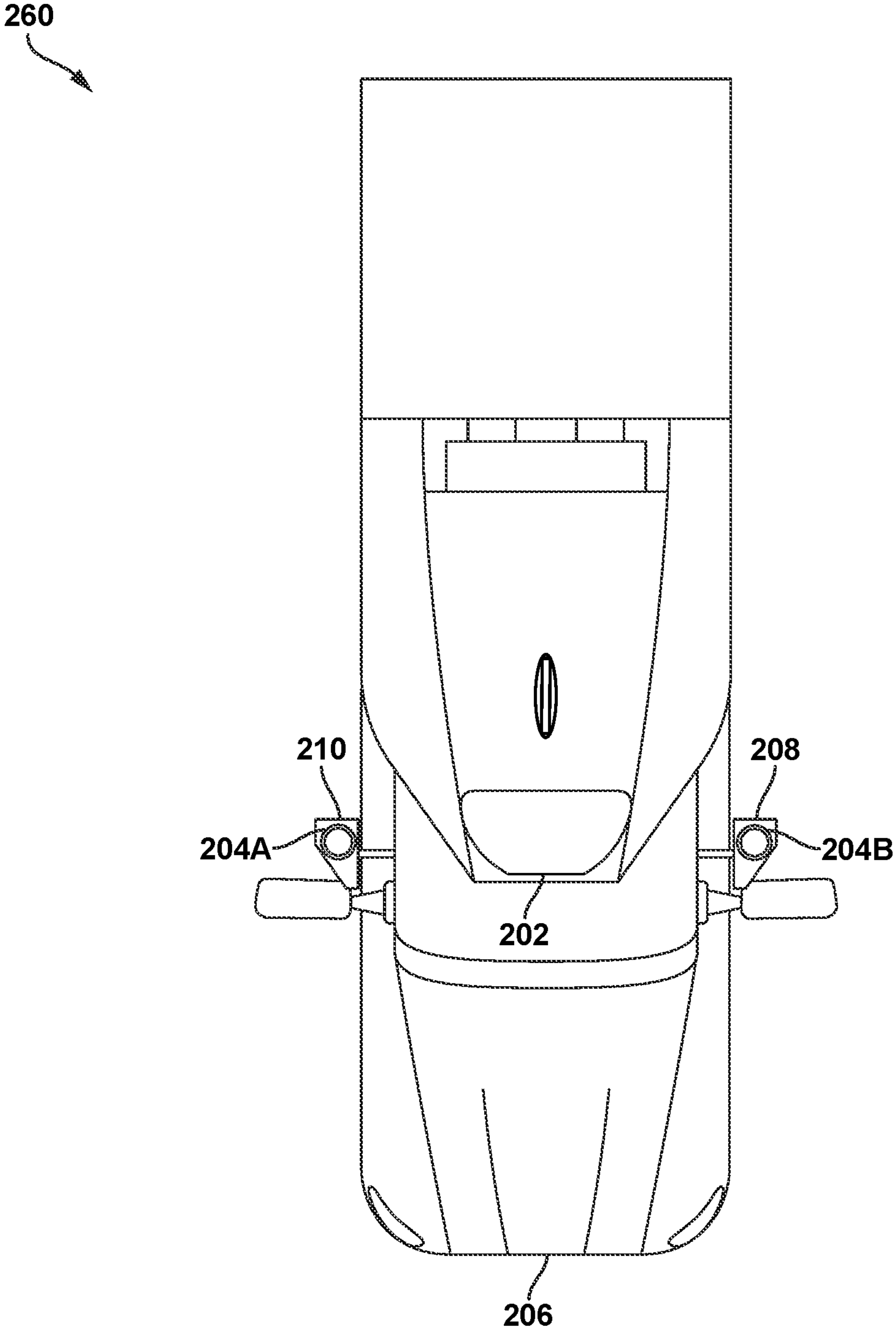
FIG. 2I is an illustration of a physical configuration of a vehicle, according to example embodiments.

As described above, in some embodiments, vehicle 200 may take the form of a van, but alternate forms are also possible and are contemplated herein. As such, FIGS. 2F-2I illustrate embodiments where vehicle 250 takes the form of a semi-truck. For example, FIG. 2F illustrates a front-view of vehicle 250 and FIG. 2G illustrates an isometric view of vehicle 250. In embodiments where vehicle 250 is a semi-truck, vehicle 250 may include tractor portion 260 and trailer portion 270 (illustrated in FIG. 2G). FIGS. 2H and 2I provide a side view and a top view, respectively, of the tractor portion 260. Similar to vehicle 200 illustrated above, vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas vehicle 200 of FIGS. 2A-2E may only include a single copy of some sensor systems (e.g., sensor system 204), vehicle 250 illustrated in FIGS. 2F-2I may include multiple copies of that sensor system (e.g., sensor systems 204A and 204B, as illustrated).

While drawings and description throughout may reference a given form of vehicle (e.g., semi-truck vehicle 250 or vehicle 200 shown as a van), it is understood that embodiments described herein can be equally applied in a variety of vehicle contexts (e.g., with modifications employed to account for a form factor of vehicle). For example, sensors and/or other components described or illustrated as being part of vehicle 200 could also be used (e.g., for navigation and/or obstacle detection and avoidance) in semi-truck vehicle 250

Figure 2J:
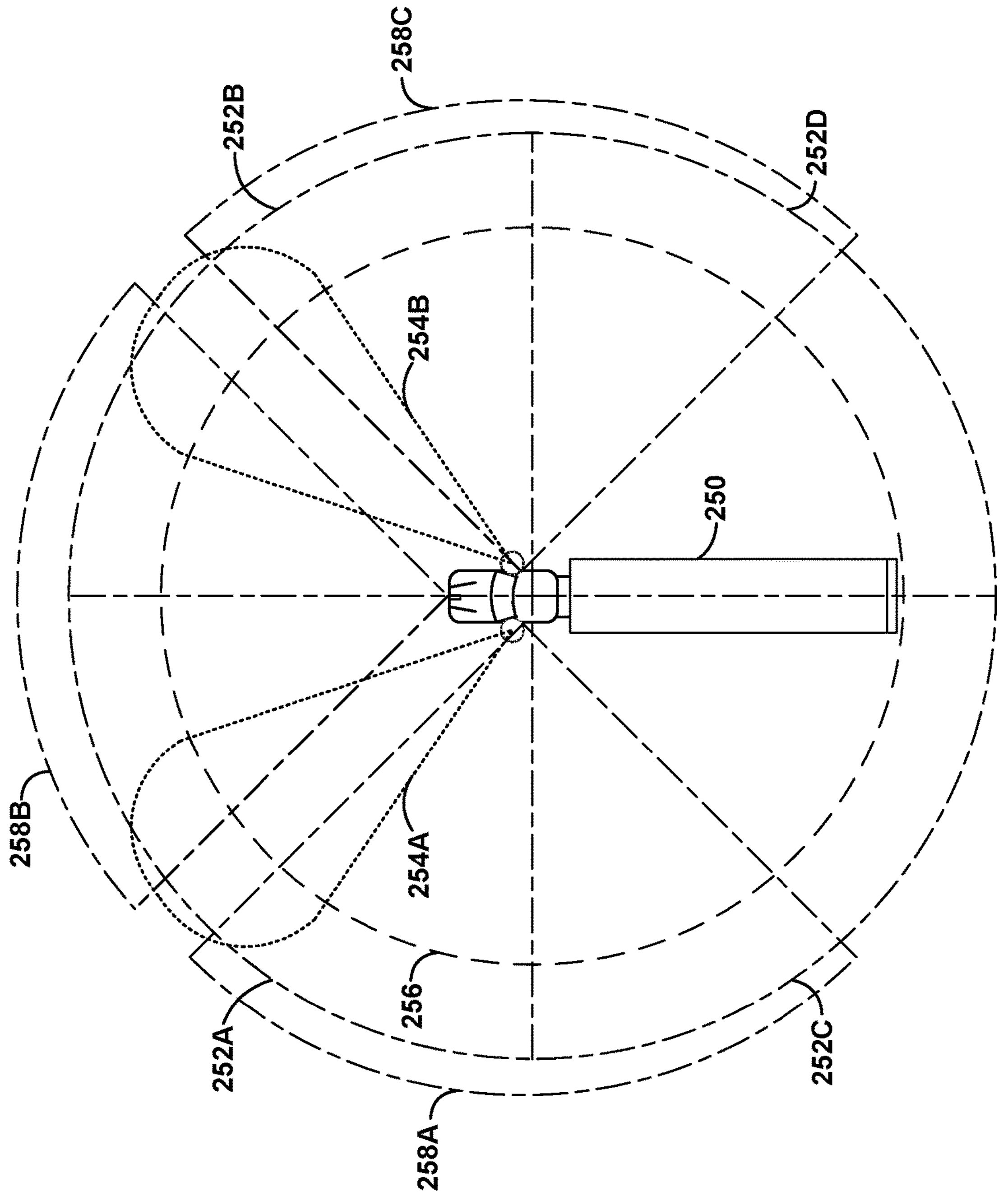
FIG. 2J is an illustration of a field of view for various sensors, according to example embodiments.

FIG. 2J illustrates various sensor fields of view (e.g., associated with vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
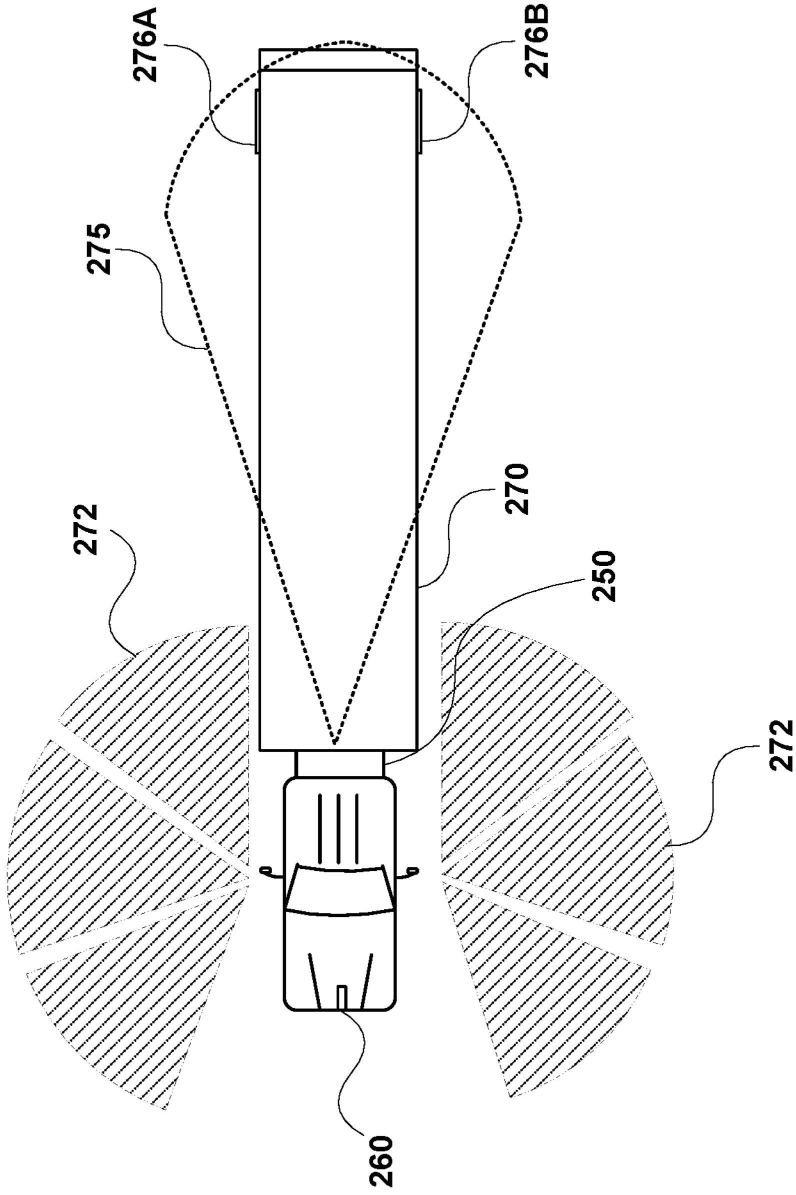
FIG. 2K is an illustration of beam steering for a sensor, according to example embodiments.

FIG. 2K illustrates beam steering for a sensor of a vehicle (e.g., vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
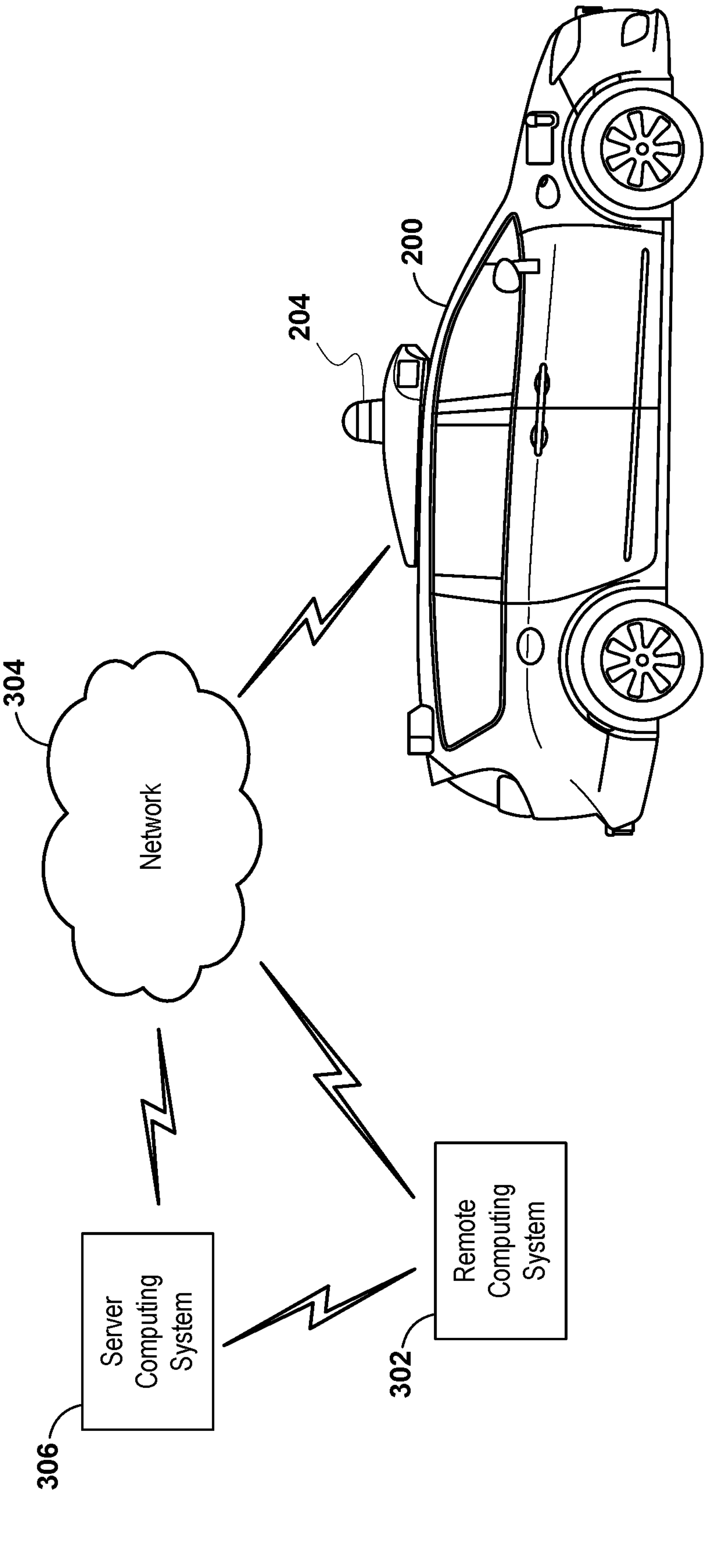
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing the velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
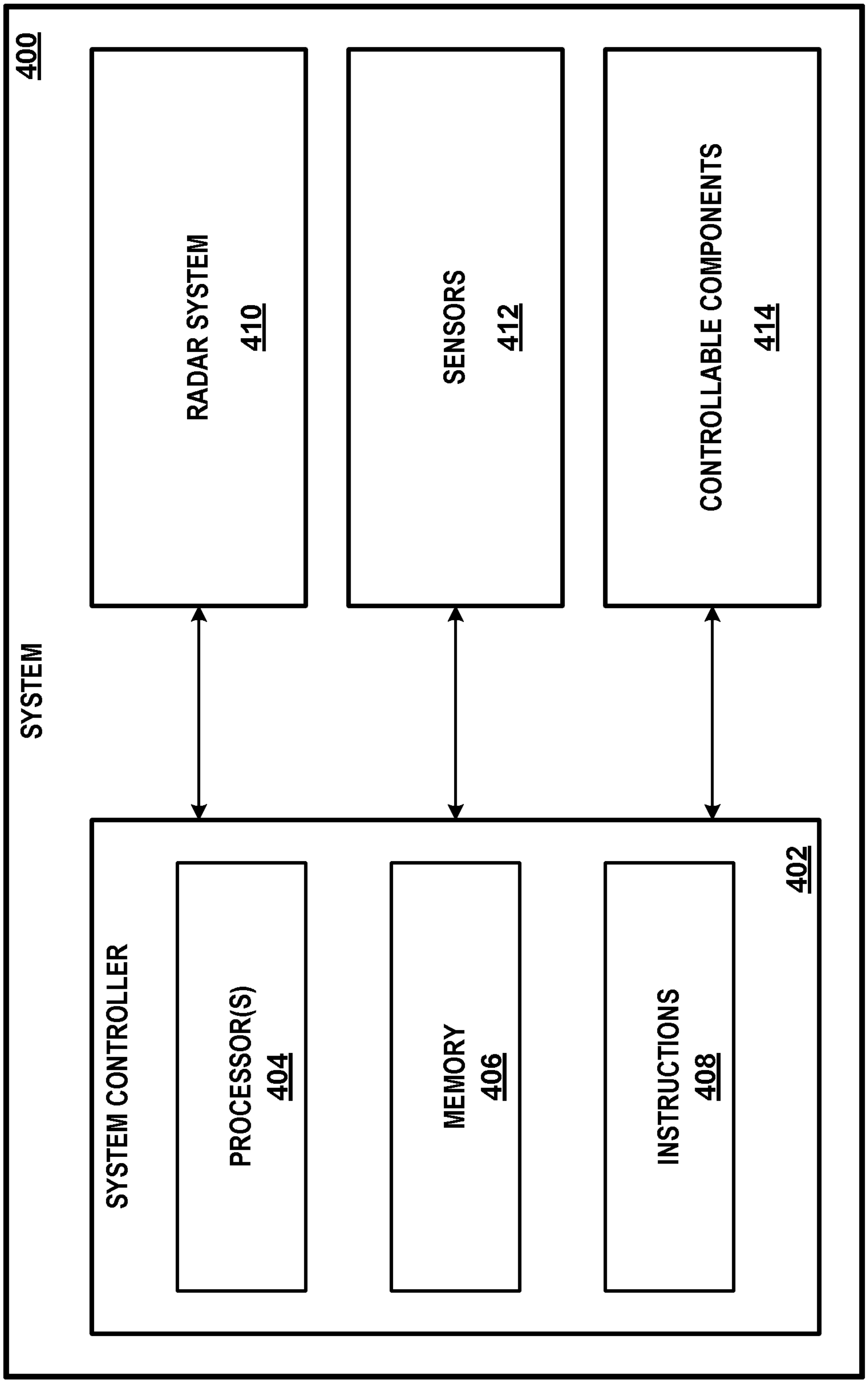
FIG. 4 is a block diagram of a system including a radar unit, according to example embodiments.

FIG. 4 is a block diagram of a system, according to example embodiments. In particular, FIG. 4 shows system 400 that includes system controller 402, radar system 410, sensors 412, and controllable components 414. System controller 402 includes processor(s) 404, memory 406, and instructions 408 stored on memory 406 and executable by processor(s) 404 to perform functions, such as the operations disclosed herein.

Processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

Memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Radar system 410 can be used in autonomous or semi-autonomous vehicles for navigation and object detection by using radio waves to detect and measure the distance, speed, and direction of objects in the surrounding environment. Radar system 410 can include one or multiple radar units, which each consists of a radar transmitter that emits radio waves and a radar receiver that captures the reflected waves from objects. By analyzing the time it takes for the waves to return and their frequency shifts (Doppler Effect), radar system 410 can determine the presence, location, and movement of objects.

In the context of autonomous or semi-autonomous vehicles, radar system 410 provides measurements that can assist with navigation and collision avoidance. Radar units are typically mounted on the vehicle's exterior, such as the front, rear, and sides. During navigation, radar system 410 may continuously emit radio waves in various directions, scanning the environment around the vehicle. When the waves encounter an object, they bounce back to a radar receiver, thereby enabling radar system 410 to analyze the reflected waves to calculate the distance, relative speed, and angle of the object. This information can be used by the vehicle's control system to make decisions and adjust the vehicle's trajectory accordingly, enabling it to detect and react to obstacles, pedestrians, vehicles, and other potential hazards in its path. By providing real-time data about the surrounding environment, radar system 410 can enhance the vehicle's perception capabilities and contribute to safer and more reliable navigation.

Radar system 410 offers operational benefits over other types of sensors in some aspects, such as cameras and lidar. Radar can perform well in adverse weather conditions, such as rain, fog, or dust, where other sensors might be limited. In particular, radio waves emitted by radar system 410 can penetrate these adverse conditions and provide reliable object detection. This makes radar particularly useful for enhancing the robustness and safety of autonomous or semi-autonomous vehicles in various weather scenarios. In addition, radar also excels at detecting the velocity and relative speed of nearby objects, which is useful for assessing the movement of surrounding vehicles, pedestrians, and other obstacles. By providing accurate speed information, radar system 410 enables the vehicle (or a driver of the vehicle) to make informed decisions about potential collision risks and adjust its behavior accordingly. In some cases, radar system 410 can also offer a longer range of measurements and broader field of view when compared to other sensors coupled to the vehicle.

Similarly, system controller 402 may use outputs from radar system 410 and sensors 412 to determine the characteristics of system 400 and/or characteristics of the surrounding environment. For example, sensors 412 may include one or more of a GPS, an IMU, an image capture device (e.g., a camera), a light sensor, a heat sensor, one or more lidar devices, and other sensors indicative of parameters relevant to system 400 and/or the surrounding environment. Radar system 410 is depicted as separate from sensors 412 for purposes of example, and may be considered as part of or as sensors 412 in some examples.

Based on characteristics of system 400 and/or the surrounding environment determined by system controller 402 based on the outputs from radar system 410 and the sensors 412, system controller 402 may control the controllable components 414 to perform one or more actions. For example, system 400 may correspond to a vehicle, in which case the controllable components 414 may include a braking system, a turning system, and/or an accelerating system of the vehicle, and system controller 402 may change aspects of these controllable components based on characteristics determined from radar system 410 and/or sensors 412 (e.g., when system controller 402 controls the vehicle in an autonomous or semi-autonomous mode). Within examples, radar system 410 and sensors 412 are also controllable by system controller 402.

Figure 5A:
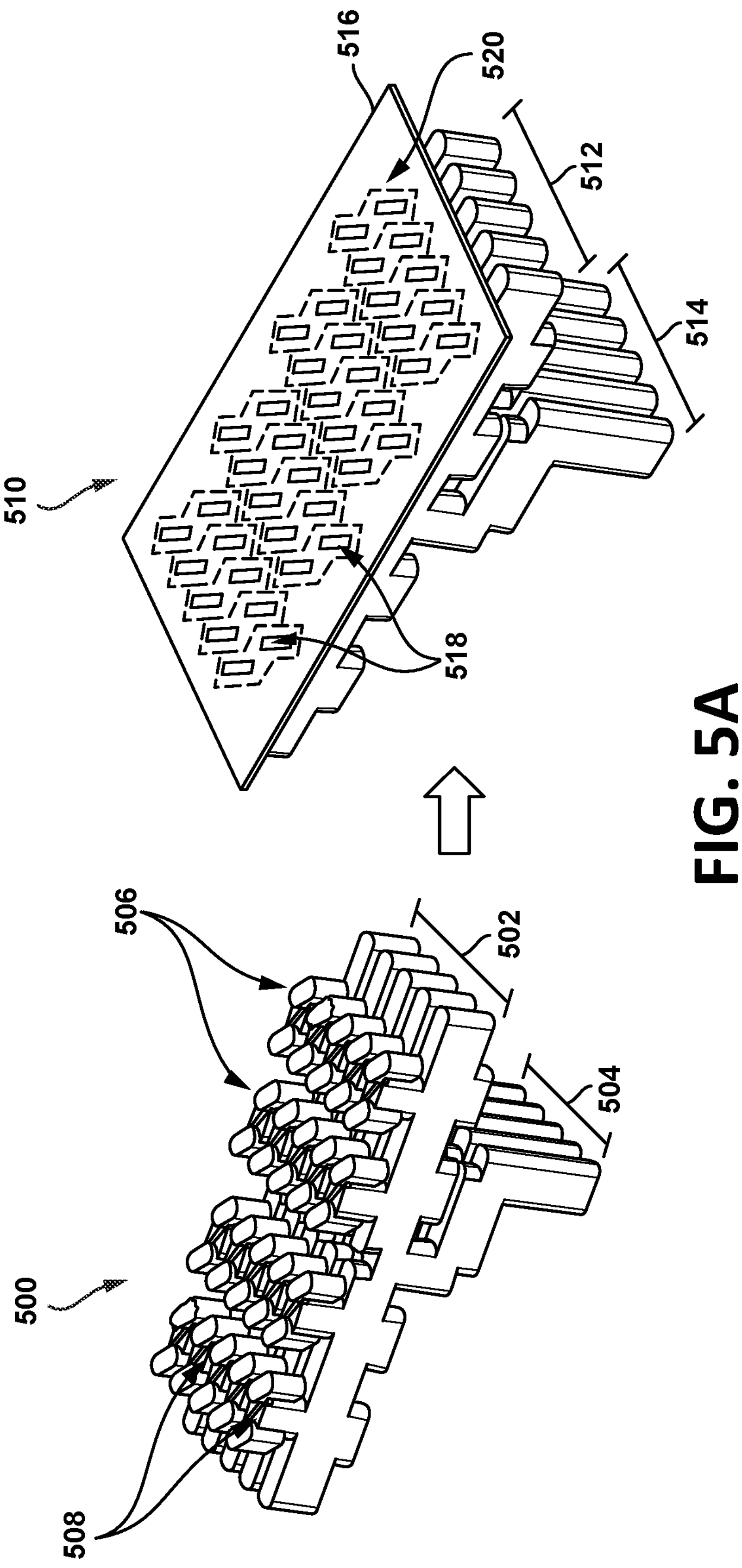
FIG. 5A is an illustration of an Open-Ended Waveguide (OEWG) antenna array and an OESIW antenna array, according to example embodiments.

FIG. 5A is an illustration showing similarities and differences between the configuration of OEWG antenna array 500 and the configuration of OESIW antenna array 510. Both OEWG antenna array 500 and OESIW antenna array 510 are shown in FIG. 5A to enable a comparison between different antenna array designs, which can be used for automotive radar signal transmission and reception as well as within other types of signal emitters.

In general, OEWG antenna array 500 represents a type of antenna system that uses a waveguide structure to efficiently radiate and/or receive electromagnetic waves. In the example embodiment, OEWG antenna array 500 is configured as a 5-channel, 4-element antenna array that can be used to transmit and receive radar signals via OEWG antenna elements 506, which are coupled to waveguides 502 and waveguide feeds 504 to enable the propagation of electromagnetic energy between an external source and the environment of OEWG antenna array 500. As such, OEWG antenna array 500 may be implemented as part of vehicle radars due to its wide bandwidth, high gain, and beamforming capabilities.

As shown in FIG. 5A, OEWG antenna array 500 consists of rectangular waveguides with open ends that act as a radiating or receiving element, which are referred to herein as OEWG antenna elements 506. Waveguides 502 may be made out of a conductive material (e.g., metal or metal-alloy) and according to a specific width and height that are determined by the desired operating frequency range for OEWG antenna array 500. Some example conductive materials include iron, steel, aluminum, copper, brass, bronze, stainless steel, titanium, nickel, lead, gold, zinc, silver, magnesium, and pewter. Electromagnetic waves are able to propagate within waveguides 502 and subsequently radiate out via OEWG antenna elements 506 as signals into the environment. The signals propagate in the environment with a polarization based on polarizers 508 positioned in between OEWG antenna elements 506.

During operations, OEWG antenna array 500 is excited by a signal source, such as a transmitter or receiver. The signal is typically in the form of an electric current that is fed into waveguides 502 through waveguide feeds 504, where the signal then propagates along the length of waveguides 502 that confine and guide electromagnetic waves within their metallic walls, preventing the electromagnetic waves from escaping sideways. As the electromagnetic waves reach OEWG antenna elements 506, a portion of the energy is radiated into free space (e.g., out into the environment as a radar signal). Similarly, OEWG antenna elements 506 can also receive electromagnetic energy from the surrounding environment since OEWG antenna elements 506 can act as apertures through which electromagnetic waves can escape or enter.

In addition, OEWG antenna array 500 consists of multiple waveguides 502 placed side by side, each with its own OEWG antenna elements 506. By controlling the excitation and phase of the signals in each waveguide, OEWG antenna array 500 can steer the main beam direction during signal transmission. This is achieved by introducing a phase difference between adjacent waveguides, thereby causing constructive or destructive interference at different angles. By dynamically adjusting the phase, OEWG antenna array 500 can scan the beam over a range of directions. In addition, the waveguide structure of OEWG antenna array 500 can provide high gain due to its ability to confine and direct the electromagnetic waves while the open-ended design enables wide bandwidth capabilities, which allows OEWG antenna array 500 to operate over a broad frequency range.

Although OEWG antenna array 500 is suitable for various applications in radar, communication, and sensing systems because it offers beamforming, beam steering, high gain, and wide bandwidth, manufacturing OEWG antenna array 500 and other antenna arrays with similar hardware designs can often be costly and require a lot of time to complete. In particular, generation of OEWG antenna elements 506 can be too detailed for die-casting to reliably produce while CNC machining requires a substantial amount of time to precisely create each OEWG antenna element, thereby making it difficult and costly to produce OEWG antenna array 500 at large scale.

As further shown in FIG. 5A, OESIW antenna array 510 represents an example antenna array that can achieve operational and power consumption capabilities comparable to OEWG antenna array 500, but with a simplified design that avoids the manufacturing complexity associated with producing OEWG antenna array 500. In particular, the configuration of OESIW antenna array 510 replaces the complex-to-manufacture OEWG antenna elements 506 and polarizers 508 with PCB 516 equipped with OESIW antenna elements 518, which is easier to manufacture and thereby reduces the time and cost needed to produce OESIW antenna array 510. As such, OESIW antenna elements 518 formed on PCB 516 can be used for signal transmission and reception in a manner similar to OEWG antenna elements 506, enabling OESIW antenna array 510 to provide similar performance capabilities at OEWG antenna array 500, including beam forming, beam steering, high gain, and wide bandwidth.

As shown by the example embodiment illustrated in FIG. 5A, the configuration of OESIW antenna array 510 shares some design aspects of OEWG antenna array 500. In particular, OESIW antenna array 510 includes waveguides 512 and waveguide feeds 514 similar to waveguides 502 and waveguide feeds 514 that are part of OEWG antenna array 500. Manufacturing of waveguides 512 and waveguide feeds 514 can be performed in the same way or a similar manner as the production of waveguides 502 and waveguide feeds 514. As such, waveguide 512 and waveguide feeds 514 can be implemented using the same materials and offer the same performance as waveguides 502 and waveguide feeds 504 described above. Thus, the primary design difference between OEWG antenna array 500 and OESIW antenna array 510 is the replacement of OEWG antenna elements 506 and polarizers 508 with PCB 516 equipped with OESIW antenna elements 518 encompassed by plated vias 520.

Figure 5B:
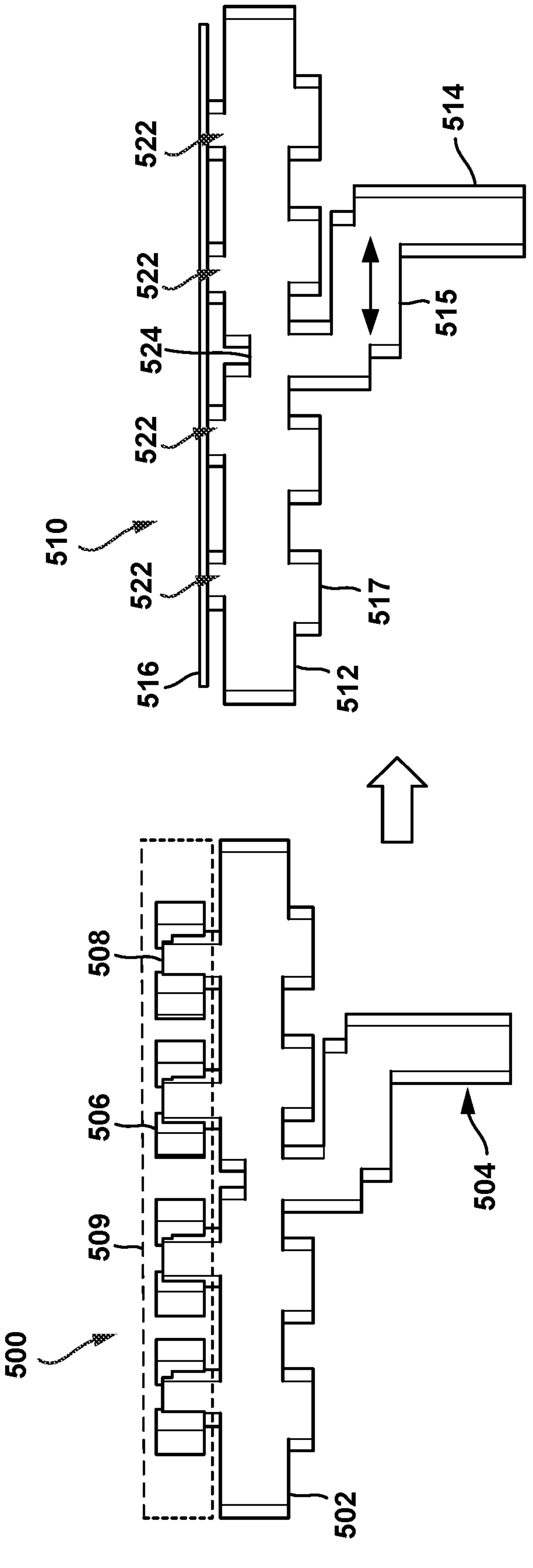
FIG. 5B is a side view illustrating similarities and differences between the configuration of the OEWG antenna array and the configuration of the OESIW antenna array shown in FIG. 5A, according to example embodiments.

FIG. 5B is a side view illustrating similarities and differences between the configuration of OEWG antenna array 500 and the configuration of OESIW antenna array 510 shown in FIG. 5A. As shown in the example embodiment, outlined box 509 encompasses the components of OEWG antenna array 500 that are replaced by PCB 516, which is shown coupled at coupling points 522 that extend from waveguides 512. At coupling points 522, electromagnetic energy propagates through waveguides 512 and can radiate out through OESIW antenna elements 518 (not shown in FIG. 5B).

Connecting PCB 516 to waveguides 512 can differ within example embodiments. For instance, PCB 516 can be connected to coupling points 522 via adhesive, soldiering, or other techniques. In some examples, PCB 516 is bonded together with waveguides 512 using RF-friendly pressure sensitive adhesive (PSA) or epoxy adhesive. PCB 516 can also be coupled to coupling points 522 via capacitive coupling.

In addition, the side view shown in FIG. 5B also shows that waveguide feeds 514 of OESIW antenna array 510 can have a particular design to broaden the impedance matching bandwidth. In particular, waveguide feeds 514 include waveguide feed portion 515 that extends in parallel relative to the orientation of waveguides 512. In this way, electromagnetic energy propagates sideways prior to entering (or exiting) waveguides 512, which can enhance performance of OESIW antenna array 510 while reducing the overall size of OESIW antenna array 510. Reducing the size of OESIW antenna array 510 enables radar units and other devices incorporating OESIW antenna array 510 to also be reduced in size overall.

As further shown in FIG. 5B, waveguides 512 can also include bottom portions 517, which enable desired propagation amplitude and phase of electromagnetic energy relative to coupling points 522 and OESIW antenna elements 518 formed into PCB 516. Waveguides 512 are also shown with indents 524 positioned relative to the connection point of waveguide feed 514. Indents 524 provide additional impedance matching capability for OESIW antenna array 500.

Figure 5C:
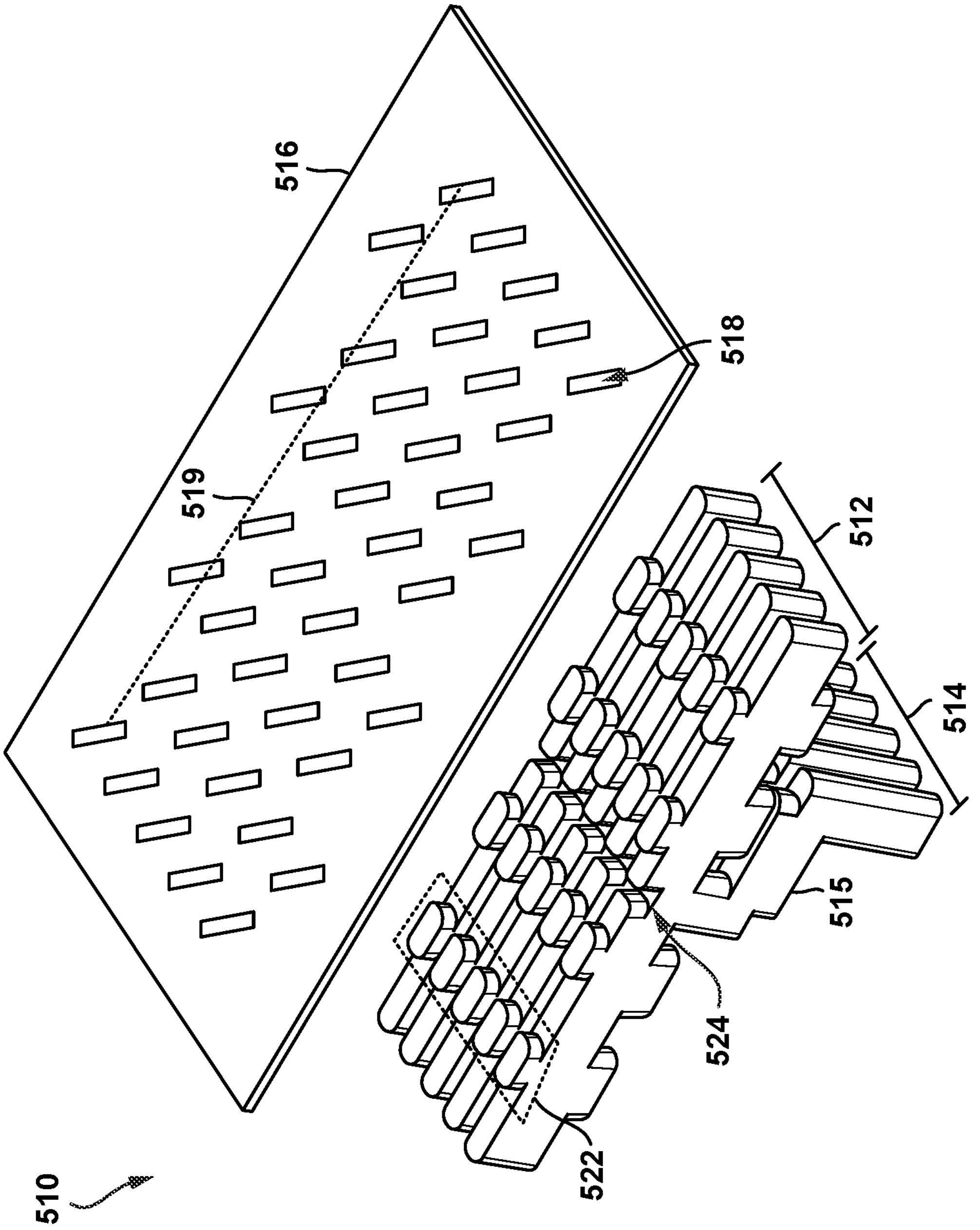
FIG. 5C is an illustration of a physical configuration of the OESIW antenna array with the PCB positioned physically separate from the waveguides, according to example embodiments.

FIG. 5C is an illustration of a physical configuration of OESIW antenna array 510 with PCB 516 being shown as positioned physically separate from waveguides 512. In the example embodiment, OESIW antenna elements 518 are shown angled relative to coupling points 522, which enables OESIW antenna elements 518 to operate in a particular polarization (e.g., slanted 45 degree polarization). The angle of OESIW antenna elements 518 can enable them to operate in horizontal polarization, vertical polarization, or slanted polarization in some cases.

In the example embodiment, each waveguide of the waveguides 512 includes four coupling points 522 that extend along a length of the waveguide. In addition, waveguides 512 are aligned in parallel such that coupling points 522 line up similarly, which reduces complexity when connecting PCB 516 to coupling points 522. In addition, the arrangement of OESIW antenna elements 518 can differ within examples. In the example shown in FIG. 5C, OESIW antenna elements 518 are arranged in multiple staggered linear arrays, with each linear array having a centerline (e.g., centerline 519) and one or more offset OESIW antenna elements relative to the centerline. As shown, one or more OESIW antenna elements 518 in each staggered linear array are offset relative to centerline 519. The staggered arrangement enables elevation of objects in the environment to be measured by OESIW antenna array 510, thereby enabling OESIW antenna array 510 to transmit signals and receive signal reflections that enable a processor to map the environment based on the signal reflections.

Figure 5D:
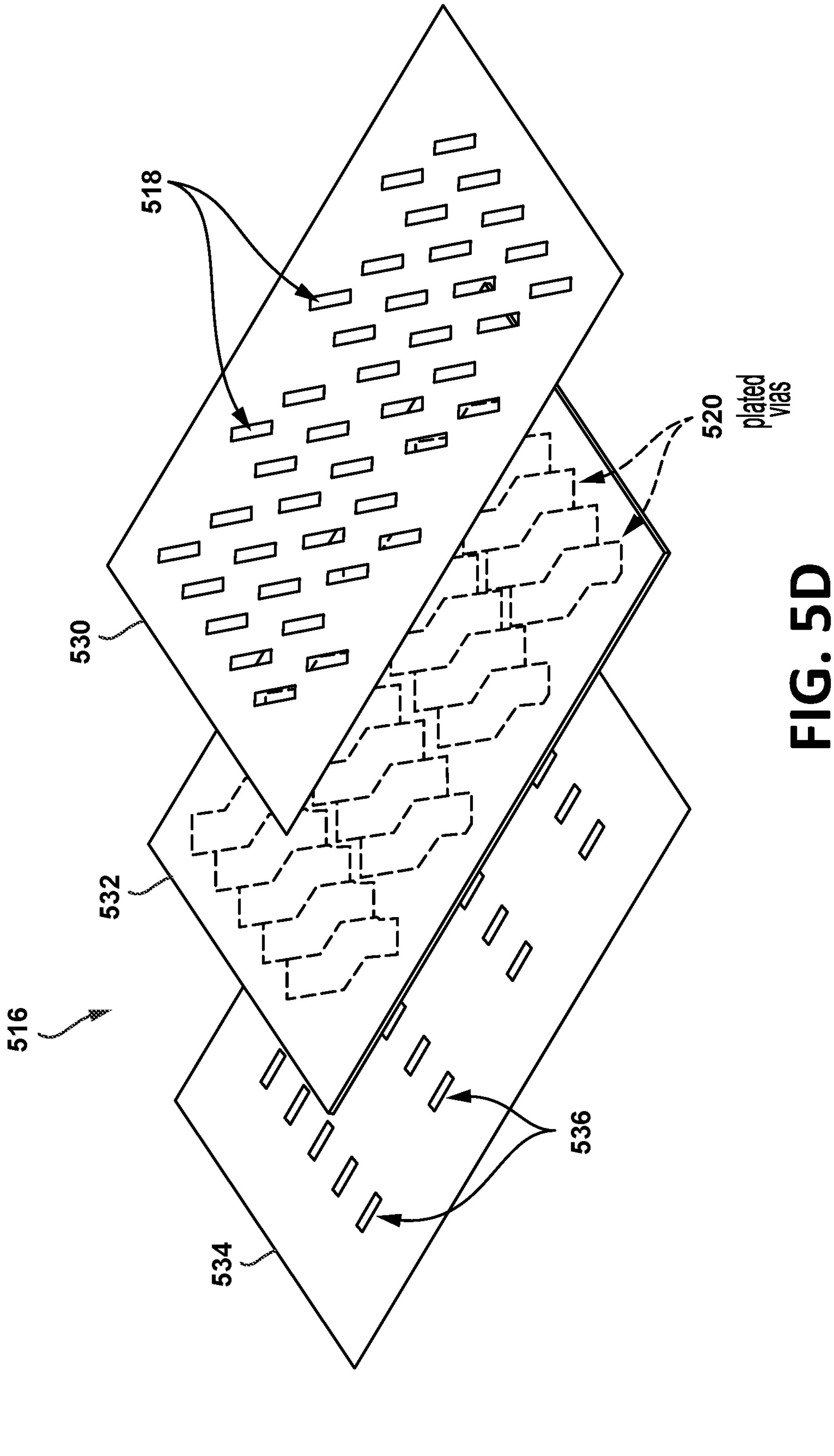
FIG. 5D illustrates the layers of the PCB, according to example embodiments.

FIG. 5D illustrates the layers of the PCB 516, which include PCB laminate 532 positioned in between top metal layer 530 and bottom metal layer 534. In other examples, PCB 516 can include more or fewer layers. In addition, the material, size, and configuration of the layers within PCB 516 can differ within examples.

As shown in FIG. 5D, top metal layer 530 includes a series of slots that form OESIW antenna elements 518. For instance, top metal layer 530 can be a sheet of copper with OESIW antenna elements 518 etched into the sheet. OESIW antenna elements 518 can be slanted when cut into top metal layer 530 to enable OESIW antenna elements 518 to operate in particular polarization. For instance, the slots can be angled to provide any polarizations needed, which can include horizontal polarization, vertical polarization, and slanted polarization. Bottom metal layer 534 also has a series of slots 536 etched away from the metal (e.g., copper). When PCB 516 is coupled to waveguides 512, slots 536 are positioned proximate to waveguides 512. In the example embodiment, the size and orientation of slots 536 in bottom metal layer 534 differ from OESIW antenna elements 518 formed in top metal layer 530. OESIW antenna elements 518 can line up with one or more slots 536 within PCB 516, which enables electromagnetic energy to propagate from waveguides 512, through slots 536, and out into the environment through OESIW antenna elements 518. Similarly, electromagnetic energy (e.g., radar reflections) can be received through OESIW antenna elements 518, propagate through slots 536, and into waveguides 512, which then direct the electromagnetic energy through waveguide feeds 514 and to a processing unit.

The middle layer of PCB 516, PCB laminate 532, contains groups of plated vias 520. Plated vias 520 are arranged to create a 5-channel, 4-OESIW elements antenna array in the example embodiment. In other examples, the groups of plated vias 520 can be rearranged to create a different number of channels and/or OESIW elements. For instance, for a 12 transmission, 16 receive imaging radar system, PCB 516 can contain 28 channels of 4-OESIW elements for approximately 12 degree elevation field of view or 6-OESIW elements for a narrower field of view. Other mixes of OESIW elements can be implemented within examples.

Figure 6:
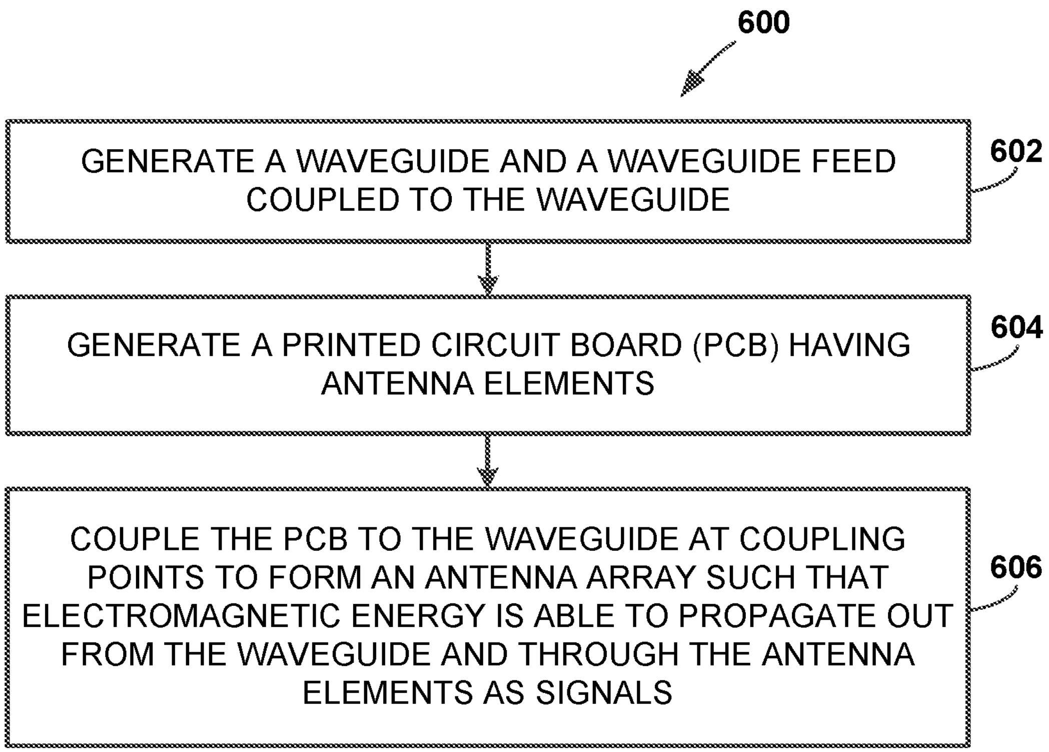
FIG. 6 is a flowchart of a method for manufacturing an OESIW antenna array, according to example embodiments.

FIG. 6 is a flow chart of method 600 for manufacturing an antenna array. Method 600 may include one or more operations, functions, or actions as illustrated by one or more of blocks 602, 604, and 606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. Various types of manufacturing processes, including automated processes, can be used to perform method 600. In addition, a variety of machines can be used to perform blocks of method 600.

At block 602, method 600 involves generating, using CNC machining or die-casting, a waveguide and a waveguide feed coupled to the waveguide. The waveguide feed is configured to couple electromagnetic energy between an external source and the waveguide. In some cases, the waveguide and the waveguide feed are generated using CNC machining or die-casting to enable large scale production of the waveguide and waveguide feed.

In some examples, the waveguide feed is coupled to a bottom side of the waveguide and a portion of the waveguide feed is aligned in parallel relative to the PCB. In addition, in some instances, the waveguide feed is coupled to the bottom side of the waveguide proximate a middle of the staggered linear array.

At block 604, method 600 involves generating a PCB having antenna elements. The PCB includes a PCB laminate layer positioned in between a bottom metal layer and a top metal layer. The bottom metal layer includes a plurality of slots and the top metal layer includes the plurality of antenna elements. Each antenna element in the top metal layer at least partially overlaps with a slot from the plurality of slots in the bottom metal layer. In some implementations, the bottom and top metal layers are layers of copper. Aluminum and other metals can be used in other implementations. In addition, the PCB can also include polarizers, which can adjust the polarization of signals transmitted by the antenna array.

In addition, the PCB can include a PCB laminate player positioned in between the top metal layer and the bottom metal layer. The PCB laminate can be generated with sets of plated vias. In some examples, each set of plated vias are positioned to extend around a pair of antenna elements from the antenna elements in the top metal layer. As such, method 600 can involve positioning plated vias in the PCB laminate layer located in between the bottom metal layer and the top metal layer, where sets of plated vias are positioned such that each set of plated vias extends around a pair of antenna elements from the plurality of antenna elements.

At block 606, method 600 involves coupling the PCB to the waveguide at coupling points to form an antenna array such that the electromagnetic energy is able to propagate out from the waveguide and through the plurality of antenna elements as signals. In some implementations, each coupling point includes a raised extension formed on a top side of the waveguide.

In some examples, method 600 further involves generating additional waveguides and coupling the PCB to respective top sides of the additional waveguides at respective coupling points located on the top sides of the additional waveguides. As such, the PCB can be coupled to respective top sides of the plurality of additional waveguides at respective coupling points. The antenna array can also be generated with additional waveguide feeds that couple to the additional waveguides and couple electromagnetic energy between the external source and the additional waveguides.

Figure 7:
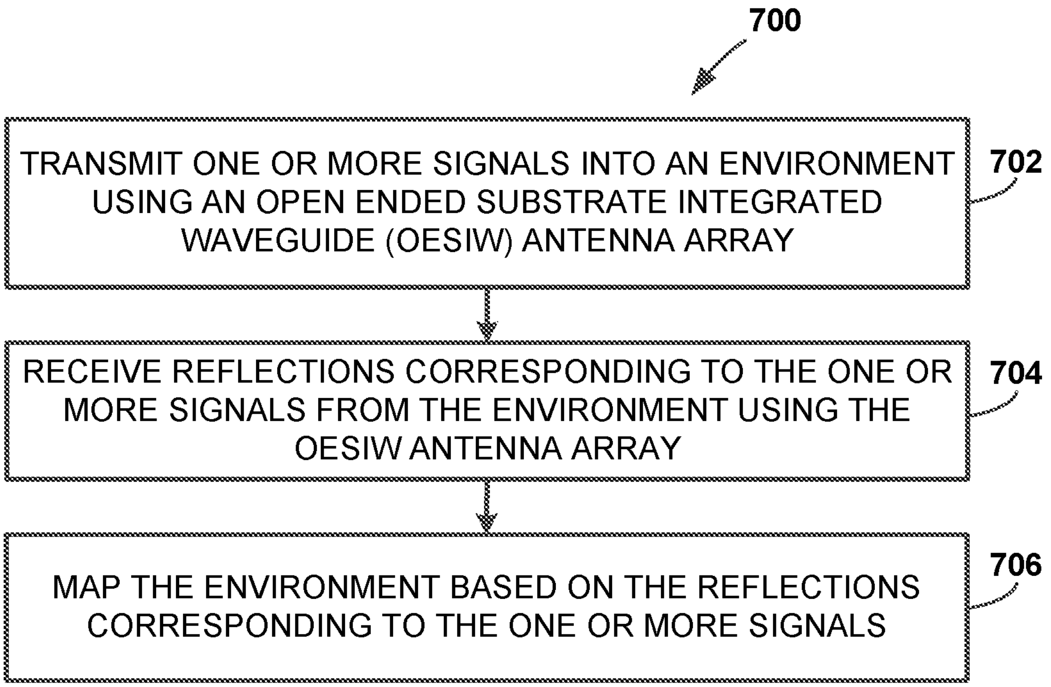
FIG. 7 is a flowchart of a method for signal transmission using an OESIW antenna array, according to example embodiments.

FIG. 7 is a flowchart of method 700 for mapping an environment using an OESIW antenna array. Method 700 may include one or more operations, functions, or actions as illustrated by one or more of blocks 702, 704, and 706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. Various types of manufacturing processes, including automated processes, can be used to perform method 700. In addition, a variety of machines can be used to perform blocks of method 700.

At block 702, method 700 involves transmitting one or more signals into an environment using OESIW antenna array. For instance, the OESIW antenna array can operate as part of a radar unit and used for radar signal transmission and reception. In some examples, the OESIW antenna array is used as part of a radar unit that is positioned on a vehicle, which uses radar data to detect the presence, distance, direction, and speed of objects in the surrounding environment of the vehicle.

At block 704, method 700 involves receiving reflections corresponding to one or more signals from the environment using the OESIW antenna array. In some examples, the OESIW antenna array may include antenna elements used for signal transmission and other antenna elements used for signal reception. In other examples, antenna elements of the OESIW antenna array can be used for both signal transmission and reception.

At block 706, method 700 involves mapping the environment based on the reflections corresponding to the one or more signals. A processing unit can be used to map the environment by analyzing aspects of the reflections, such as the power levels received.

In some examples, the OESIW antenna elements are used together to achieve specific beamforming characteristics. For instance, the antenna elements can be spatially distributed in a specific pattern on the PCB, such as in one or more linear arrays, planar arrays, or three-dimensional arrays. Each antenna element of the OESIW antenna array can independently adjust the phase of the signal it transmits or receives, thereby enabling phase shifting that allows for beamforming. Beamforming is the process of directing the transmitted or received radio waves in a specific direction or forming a specific radiation pattern. By adjusting the phase of the signals across the array, the OESIW antenna array can create constructive interference in a desired direction and destructive interference in other directions. In addition, the phase shifting across the OESIW antenna array can be carefully controlled to steer the beam in the desired direction. By adjusting the phase differences between the antenna elements, the transmitted or received beam can be steered electronically without physically moving the antennas. As such, the beam characteristics, such as the shape, direction, and beamwidth, can be controlled by adjusting the phase differences across the antenna elements. This allows for various beamforming strategies when using the OESIW antenna array, such as creating a narrow beam for long-range communication or a wider beam for broader coverage.

In receive mode, the signals received by each antenna element of the OESIW can be combined coherently to enhance the received signal strength in the desired direction. The phase differences and signal combining help improve the ability of the OESIW antenna array to receive signals from a specific direction while reducing interference from other directions. In some examples, the OESIW antenna array can employ adaptive beamforming techniques, where the phase shifting is dynamically adjusted based on feedback or measurements from the environment. This allows the OESIW antenna array to be used in a way that adapts to changing conditions, such as interference, multipath propagation, or moving targets.

In some examples, the OESIW antenna array is used with control electronics, which can include one or more field-programmable gate arrays (FPGAs), ASICs, CPUs, GPUs, and/or TPUs. For instance, a radar unit can use the OESIW antenna array to generate and receive complex signals that require significant processing. One or more control electronics can be programmed to implement various signal processing algorithms, such as filtering, modulation/demodulation, noise reduction, and digital beamforming. These operations help extract relevant information from the received radar signals, enhance signal quality, and improve target detection and tracking. In addition, radar systems often involve the conversion of analog signals to digital format for further processing. The control electronics can include analog-to-digital converters (ADCs) and digital-to-analog converters (DACs) to facilitate these conversions. The control electronics can receive analog signals from radar sensors, digitize them, and process the digital data for analysis and interpretation.

In addition, the control electronics can also provide the capability for real-time control and coordination of various radar system components. For instance, the control electronics can handle synchronization, timing generation, and system control, ensuring the proper timing and sequencing of operations within the radar system. This real-time control is crucial for accurate and synchronized signal transmission and reception. The control electronics can efficiently handle large amounts of data generated by the radar system. The control electronics can implement data storage, buffering, and data flow management techniques, enabling efficient data handling during signal transmission. This includes tasks such as data compression, data packetization, and data routing, ensuring smooth and reliable data transmission within the radar system. The control electronics can also integrate various interfaces and protocols required for radar signal transmission, such as processors, memory modules, communication modules, and display units. The control electronics can provide the necessary interface logic to facilitate seamless data exchange between these components, enabling efficient data flow and system integration. The control electronics can also be reconfigured and customized to meet specific radar system requirements and adapt to changing operational needs. This allows radar system designers to implement and optimize algorithms and functionalities specific to their application, resulting in enhanced performance and efficiency.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An antenna array comprising:

a waveguide;

a waveguide feed coupled to the waveguide, wherein the waveguide feed is configured to couple electromagnetic energy between an external source and the waveguide; and a printed circuit board (PCB) having a plurality of antenna elements, wherein the PCB is coupled to the waveguide at a plurality of coupling points such that the electromagnetic energy propagates out from the waveguide and through the plurality of antenna elements, wherein the PCB comprises a PCB laminate layer positioned in between a bottom metal layer and a top metal layer, wherein the bottom metal layer includes a plurality of slots and the top metal layer includes the plurality of antenna elements, and wherein each antenna element in the top metal layer is positioned to at least partially overlap with one or more slots of the plurality of slots in the bottom metal layer.

2. The antenna array of claim 1, wherein each coupling point includes a raised extension formed on a top side of the waveguide.

3. The antenna array of claim 1, wherein the PCB laminate layer includes sets of plated vias, wherein each set of plated vias are positioned to extend around a pair of antenna elements from the plurality of antenna elements.

4. The antenna array of claim 3, wherein the sets of plated vias are arranged to cause the plurality of antenna elements to operate in a particular polarization.

5. The antenna array of claim 4, wherein the plurality of antenna elements are positioned at an angle relative to the plurality of slots to cause the plurality of antenna elements to operate in the particular polarization.

6. The antenna array of claim 1, further comprising:

a plurality of additional waveguides, wherein the PCB is coupled to respective top sides of the plurality of additional waveguides at respective coupling points.

7. The antenna array of claim 6, further comprising:

a plurality of waveguide feeds coupled to the plurality of additional waveguides, wherein the plurality of waveguide feeds couple electromagnetic energy between the external source and the plurality of additional waveguides.

8. The antenna array of claim 1, wherein the waveguide and the waveguide feed are generated using computer numerical control (CNC) machining or die-casting.

9. The antenna array of claim 8, wherein the plurality of antenna elements are etched into the PCB.

10. The antenna array of claim 1, wherein the plurality of antenna elements are arranged in a staggered linear array having a centerline, and wherein one or more antenna elements in the staggered linear array are offset relative to the centerline.

11. The antenna array of claim 10, wherein the waveguide feed is coupled to a bottom side of the waveguide, and wherein a portion of the waveguide feed is aligned in parallel relative to the PCB.

12. The antenna array of claim 11, wherein the waveguide feed is coupled to the bottom side of the waveguide proximate a middle of the staggered linear array.

13. A method comprising:

generating, using computer numerical control (CNC) machining or die-casting, a waveguide and a waveguide feed coupled to the waveguide, wherein the waveguide feed is configured to couple electromagnetic energy between an external source and the waveguide;

generating a printed circuit board (PCB) having a plurality of antenna elements, wherein generating the PCB having the plurality of antenna elements comprises:

cutting a plurality of slots in a bottom metal layer of the PCB and the plurality of antenna elements in a top metal layer of the PCB, wherein the PCB comprises a PCB laminate layer positioned in between the bottom metal layer and the top metal layer, and wherein each antenna element in the top metal layer is positioned to at least partially overlap with one or more slots of the plurality of slots in the bottom metal layer; and coupling the PCB to the waveguide at a plurality of coupling points to form an antenna array such that the electromagnetic energy is able to propagate out from the waveguide and through the plurality of antenna elements as signals.

14. The method of claim 13, wherein each coupling point includes a raised extension formed on a top side of the waveguide, and wherein coupling the PCB to the waveguide at the plurality of coupling points comprises:

coupling the PCB to the waveguide to each coupling point having the raised extension formed on the top side of the waveguide.

15. The method of claim 13, further comprising:

positioning a plurality of plated vias in a PCB laminate layer located in between the bottom metal layer and the top metal layer, wherein sets of plated vias are positioned such that each set of plated vias extends around a pair of antenna elements from the plurality of antenna elements.

16. The method of claim 13, wherein coupling the PCB to the waveguide at the plurality of coupling points comprises:

applying adhesive to the plurality of coupling points; and coupling the PCB to the waveguide at the plurality of coupling points using the adhesive.

17. A radar unit comprising:

an external source configured to provide and receive electromagnetic energy; and an antenna array coupled to the external source, wherein the antenna array comprises:

a waveguide;

a waveguide feed coupled to the waveguide, wherein the waveguide feed is configured to couple the electromagnetic energy between the external source and the waveguide; and a printed circuit board (PCB) having a plurality of antenna elements, wherein the PCB is coupled to the waveguide at a plurality of coupling points such that the electromagnetic energy propagates out from the waveguide and through the plurality of antenna elements, wherein the PCB comprises a PCB laminate layer positioned in between a bottom metal layer and a top metal layer, wherein the bottom metal layer includes a plurality of slots and the top metal layer includes the plurality of antenna elements, and wherein each antenna element in the top metal layer is positioned to at least partially overlap with one or more slots of the plurality of slots in the bottom metal layer.

18. The antenna array of claim 1, further comprising:

a waveguide feed portion that extends in a parallel alignment relative to an orientation of the PCB, wherein the parallel alignment of the waveguide feed portion is configured to broaden an impedance matching bandwidth and reduce an overall size of the antenna array.

19. The antenna array of claim 1, wherein the plurality of antenna elements are arranged in one or more staggered linear arrays, and wherein the staggered arrangement is configured to enable measurement of elevation of objects in an environment by the antenna array.

20. The antenna array of claim 1, wherein the plurality of antenna elements are formed as a plurality of slots cut into the top metal layer, and wherein the slots forming the plurality of antenna elements are slanted relative to the top metal layer to cause the plurality of antenna elements to operate in a specific slanted polarization.

* * * * *